(12) United States Patent
Liang et al.

(10) Patent No.: US 8,708,764 B2
(45) Date of Patent: Apr. 29, 2014

(54) SWITCHABLE COLOR PARTICLE-BASED DISPLAY AND METHOD OF MANUFACTURING SAME

(75) Inventors: Rong-Chang Liang, Cupertino, CA (US); Jiunn-Jye Hwang, New Taipei (TW); Jung-Yang Juang, Taipei (TW); Ya-Zhu Xu, Yilan County (TW); Chieh-Wen Yang, Pingtung County (TW)

(73) Assignee: Delta Electronics Inc., Taoyuan Hsien (TW)

( * ) Notice: Subject to any disclaimer, the term of this patent is extended or adjusted under 35 U.S.C. 154(b) by 290 days.

(21) Appl. No.: 13/342,861

(22) Filed: Jan. 3, 2012

(65) Prior Publication Data

US 2012/0329356 A1 Dec. 27, 2012

Related U.S. Application Data

(63) Continuation-in-part of application No. 13/167,927, filed on Jun. 24, 2011, now Pat. No. 8,419,495.

(51) Int. Cl.
*H01J 9/20* (2006.01)
*G02B 26/00* (2006.01)
(52) U.S. Cl.
USPC .............. 445/25; 445/23; 445/24; 359/296
(58) Field of Classification Search
USPC ..................................... 445/23–25; 359/296
See application file for complete search history.

(56) References Cited

U.S. PATENT DOCUMENTS

| 3,544,550 | A | 12/1970 | Anderton et al. |
| 3,770,719 | A | 11/1973 | Fisher et al. |
| 3,816,391 | A | 6/1974 | Coates et al. |
| 4,046,752 | A | 9/1977 | Hohmann et al. |
| 4,207,233 | A | 6/1980 | Seybold et al. |
| 4,224,220 | A | 9/1980 | Lamm |
| 7,787,169 | B2 * | 8/2010 | Abramson et al. ............. 359/267 |
| 2009/0244688 | A1 * | 10/2009 | Fujiwara et al. ............. 359/296 |
| 2010/0288639 | A1 * | 11/2010 | Wang et al. .................... 204/483 |
| 2012/0099181 | A1 * | 4/2012 | Shitagami et al. ............ 359/296 |

OTHER PUBLICATIONS

Chih-Feng Wang et al., Fabrication of Biomimetic Super-Amphiphobic Surfaces Through Plasma Modification of Benzoxazine Films, Macromol. Rapid Commun., 2006, pp. 333-337, vol. 27.

(Continued)

*Primary Examiner* — Anh Mai
*Assistant Examiner* — Nathaniel Lee
(74) *Attorney, Agent, or Firm* — Morris Manning & Martin LLP; Tim Tingkang Xia, Esq.

(57) ABSTRACT

The invention in one relates to a method for manufacturing a switchable particle-based display having a plurality of display units spatially arranged in a matrix form, wherein each display unit comprises one or more cells. In one embodiment, the method includes filling a plurality of first-type particles into the one or more cells of each display unit, filling one or more solutions into the one or more cells of each display unit, respectively, so that each cell contains one of the one or more solutions, where each of the one or more solutions comprises a respective colorant, and the respective colorant in each cell reacts with or adsorbs on the first-type particles therein, and filling a plurality of second-type particles into the one or more cells of each display unit.

47 Claims, 2 Drawing Sheets

(56) References Cited

OTHER PUBLICATIONS

Chih-Feng Wang et al., Low-Surface-Free-Energy Materials Based on Polybenzoxazines, Angew. Chem. Int. Ed., 2006, pp. 2248-2251, vol. 45.

Akira Nakajima et al., Transparent Superhydrophobic Thin Films with Self-Cleaning Properties, Langmuir, 2006, pp. 7044-7047, vol. 16.

Marianne K. Bernett et al., Wetting Properties of Tetrafluoroethylene and Hexafluoropropylene Copolymers, J. Phys. Chem., 1960, pp. 1292-1294, vol. 64.

Alexander Otten et al., How Plants Keep Dry: A Physicist's Point of View, Langmuir, 2004, pp. 2405-2408, vol. 20.

Dettre RH et al., Surface Tensions of Perfluoroalkanes and Polytetrafluoroethylene, Journal of Colloid and Interface Science, Dec. 1969, pp. 568-569, vol. 31, No. 4.

Doug Anton, Surface-Fluorinated Coatings, Advanced Materials, 1998, pp. 1197-1205, vol. 10, No. 15.

N.N. Ghosh et al., Polybenzoxazines-New high performance thermosetting resins: Synthesis and properties, Prog. Polym. Sci., 2007, pp. 1344-1391, vol. 32.

C.P. Reghunadhan Nair et al., Advances in addition-cure phenolic resins, Prog. Polym. Sci., 2004, pp. 401-498, vol. 29.

Ralf Blossey, Self-cleaning surfaces-virtual realities, Nature Materials, May 2003, pp. 301-306, vol. 2.

Chun-Syong Liao et al., Modification of Polymer Substrates with Low Surface Free Energy Material by Low-Temperature Cured Polybenzoxazine$^a$, Macromol. Rapid Commun., 2008, pp. 52-56, vol. 29.

Qiongdan Xie et al., Facile Creation of a Super-Amphiphobic Coating Surface with Bionic Microstructure, Advanced Materials, Feb. 17, 2004, pp. 302-305, vol. 16, No. 4.

Aurélie Lafuma et al., Superhydrophobic states, Nature Materials, Jul. 2003, pp. 457-460, vol. 2.

Solomons T. W. G., 18.3 Preparation of Carboxylic Acids, Organic Chemistry 6th ad., 1997, pp. 803-810.

Merrington J, James M, Bradley M, Chem Commun 2002, 2, 140.

Caldarelli M, Baxendale IR, Ley SV, Green Chem, 2000, 2, 43.

Winnik FM, Ober CK, Eur Polym J 1987, 8,617.

Horak D, Svec F, Frechet JMJ, J Polym Sci Part A:Polym Chem 1995, 33, 2961.

Tronc F, Li M, Lu JP, Winnik MA, Kaul BL, Graciet, JC, J Polym Sci Part A:Polym Chem 2003, 41, 766.

Shnurpfeil G, Stark J, Wohrle D, Dyes and pigments 1995, 27, 339.

Jing-She Song et al., Monodisperse, controlled micron-size dye-labeled polystyrene particles by two-stage dispersion polymerization, Polymer, 2006, pp. 817-825, vol. 47.

* cited by examiner

SWITCHABLE COLOR PARTICLE-BASED DISPLAY AND METHOD OF MANUFACTURING SAME

CROSS-REFERENCE TO RELATED PATENT APPLICATION

This application is a continuation-in-part of U.S. patent application Ser. No. 13/167,927, filed Jun. 24, 2011, entitled "SWITCHABLE PARTICLE-BASED DISPLAY AND METHOD OF MANUFACTURING SAME" by Rong-Chang Liang, Jiunn-Jye Hwang, Jung-Yang Juang, and Min-Chiao Tsai, the disclosure of the above identified co-pending application is incorporated herein by reference in its entirety.

Some references, if any, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates to a display, and more particularly, to a color particle-based display and method of manufacturing same.

BACKGROUND OF THE INVENTION

Particle-based display (PBD) technology has drawn a great deal of attention in display industries in recent years. Due to its wide viewing angles, low power consumptions, light weight, and thin thickness, PBDs have found widespread applications in a variety of fields, for example, in electronic readers, electronic papers, electronic tags, electronic signages, and the like. PBDs are capable of providing visual effects similar to that of paper reading. Different from backlight-type flat panel displays, PBDs utilize reflected ambient light from pigment particles to display content, and thus, there is no glare or other effects resulted from strong external light which affect reading. In addition, PBDs consume power only when the displayed contents are subjected to change.

A PBD includes a plurality of independently addressable display units spatially arranged in the form of a matrix. Each display unit is formed with a plurality of display cells, where each display cell is filled with pigment particles. Each display unit is disposed between a pair of opposed, spaced-apart substrates, and electrodes disposed on at least one substrate. When, by applying voltages onto the electrodes, an electric field is generated between the pair of substrates, the charged pigment particles in the cells migrate by attraction to the respective electrodes having opposite polarities. Thus, the locations of the pigment particles can be controlled by changing the polarities of the electrodes, thereby displaying images of the reflected light from the pigment particles or fluid.

Based on media that suspend/disperse the pigment particles in the cells, PBDs can be grouped into electrophoretic displays or dry powder type displays.

The electrophoretic displays include microcup electrophoretic displays and microcapsule electrophoretic display. In a microcup electrophoretic display, charged pigment particles (usually in white color) are dispersed in a colored fluid, which in turn, is filled in microcup display cells. The microcup display cells are then sealed between the pair of electrodes. The migrations of the pigment particles in the fluid are controlled by changing the voltage difference between the pair of electrodes, so as to achieve image displaying. For the microcup electrophoretic display, in addition to a slow response time of image displaying due to the slow migration of the pigment particles in the fluid, it is difficult to achieve the uniform dispersion of the pigment particles in the fluid, thereby reducing the uniformity of the particle filling in the display cells. In addition, a big hurdle which is difficult to overcome exists in the manufacturing process of filling the colored fluid and the pigment particles with different colors into respective display cells. If there is any misstep in the filling process, the colored fluid in the display cells may be contaminated, which results in color deviation of the display. Therefore, for the microcup electrophoretic display, the particles filling process is complicated and difficult to control, thereby increasing manufacturing costs. Also, the uniformity of the particle dispersion is yet to be further improved.

In a microcapsule electrophoretic display, two types of charged pigment particles of white and black colors with opposed polarities are filled and packaged in microcapsule display cells containing a solvent, which are sandwiched between a pair of electrodes. By changing the voltage difference between the pair of electrodes, the pigment particles can be suspended or fell in the microcapsule cells so that color image displaying can be achieved with coordination of a color filter. Similarly, the microcapsule electrophoretic display has a slow response time of image displaying due to slow motions of the pigment particles in the solvent. Further, particle aggregation exists, thereby causing the instability of the dispersion of the pigment particles in the solvent, which in turn, affects the yield rate of production. In addition, the color filter is required in this type of display to achieve color image displaying. The manufacturing process of the color filter is highly complicated and sophisticated, resulting in high manufacturing cost of the color microcapsule electrophoretic display that cannot be reduced. Also, design of the microcapsule electrophoretic display is restricted due to the existence of the color filter in the display structure. Further, the color filter reduces reflectivity of light from the environmental light source, resulting in poor chromaticity in the display.

As for a dry powder type display, each display cell is filled with two colored particles in contrast (e.g., black and white) having charges with opposite polarities, respectively. The floating state and the falling state of the different colored particles in the cells are controlled by varying external electric fields imposed on the pigment particles, thereby achieving color image displaying with coordination of the color filter. Similarly, the color filter is required in this type of display to achieve color image displaying. The manufacturing process of the color filter is highly complicated and sophisticated, resulting in high manufacturing cost of the color dry powder type display that cannot be reduced. Also, design of the dry powder type display is restricted due to the existence of the color filter in the display structure. Further, the color filter reduces reflectivity of light from the environmental light source so that the color saturation of the display is reduced. Moreover, in order to overcome the drawbacks of the slow responses of the electrophoretic displays, the pigment particles in the dry powder type displays are selected to have better flowability and floodability. As such, the pigment particles have the characteristic of fluid, and thus move fast when driven by an electric field. However, during the filling process, the pigment particles may be dispersed or spread all over the cells, i.e., the falling of the pigment particles is not along straight line even under the effect of the gravity. If the pigment particles are not uniformly filled, the display would generate color deviation in color image displaying so that yield of the display is reduced.

Therefore, a heretofore unaddressed need exists in the art to address the aforementioned deficiencies and inadequacies.

SUMMARY OF THE INVENTION

In order to overcome the above mentioned limitations and disadvantages of the existing methods for manufacturing color PBDs, one of the objectives of this invention is to provide a switchable color PBD manufacturing method that enables forming color pigment particles of different colors and filling the same uniformly into the display cells, without aggregation of particles of different colors therein that may lead to color deviation. According to the present invention, the processes of forming pigment particles, filling the same into the cells of each display unit, and sealing the cells are greatly simplified, which are adapted for both the electrophoretic display and the dry powder type display. Further, according to the present invention, color image displaying can be achieved without the need of color filters. In one embodiment, the switchable PBD has a plurality of display units spatially arranged in a matrix form. Each display unit has one or more cells. Each cell comprises compartment, microcup, microgrid, or partition structure.

In one aspect, the method includes filling first-type particles into respectively independent display cells of the display units. The first-type particles include wettable particles having reaction selectivity and light fastness, and the color thereof can be colorless or white. Then colorants or solutions containing such colorants are respectively filled into the display cells of the display units, preferably by ink-jet printing, where the colorant reacts with the first-type particles so that the first-type particles in different cells have different colors. Next, the second-type particles are filled into the display cells of each display unit. The second-type particles can be black or white. At this stage, the formation and fill of the color pigment particles in the cells are completed. The display cells of each display unit are then sealed between two substrates with electrodes. As such, when different voltages are applied onto the electrodes, an electric field is generated therebetween, and the color pigment particles will move accordingly, thereby achieving color image displaying.

In one embodiment, the display unit sealing process is performed after the solution is evaporated from the cells of each display unit. In this case, a dry powder type color PBD is obtained.

In another aspect, the method includes filling first-type particles into respectively independent display cells of the display units, where the first-type particles can be colorless or in a color of white. The first-type particles include wettable particles having reaction selectivity and light fastness, and the color thereof can be colorless or white. Then colorants or solutions containing such colorants are respectively filled into the display cells of each display unit, preferably by ink jet printing, where the colorant reacts with the first-type particles so that the first-type particles in different cells display different colors. Then, second-type particles are filled into the respective display cells of each display unit. The second-type particles include non-wettable particles having chemical inertness and carrying charges with a high charge density, and the color thereof can be black or white. Then a charge controlling agent or a solution containing such a charge controlling agent is filled into the display cells of the display units, preferably by ink jet printing. The charge controlling agent has a charge polarity opposite to that of the second-type particles. Under certain conditions, the charge controlling agent chemically reacts with or physically adsorbs to the first-type particles. Consequently, the first-type particles are charged with a high charge density and a charge polarity same as that of the charge controlling agent but opposite to that of the second-type particles. Thus, the formation and fill of the color pigment particles in the cells are completed. The display units are then sealed between two substrates with electrodes. As such, when different voltages are applied onto the electrodes, an electric field is generated therebetween, and the color pigment particles will move accordingly, thereby achieving color image displaying.

In one embodiment, the display unit sealing process is performed after the solution is evaporated from the cells. In this case, a dry powder type color PBD is obtained.

In yet another aspect of the present invention, the method includes filling a plurality of first-type particles into the one or more cells of each display unit, filling a solution comprising a colorant into the one or more cells of each display unit, such that the colorant reacts with or adsorbs on the plurality of first-type particles therein, and filling a plurality of second-type particles into the one or more cells of each display unit. The respective colorant comprises a color precursor.

In one embodiment, the method further includes sealing the one or more cells of each display unit subsequent to filling the plurality of second-type particles into the one or more cells of each display unit. In another embodiment, the method also includes removing the solution prior to filling the plurality of second-type particles into the one or more cells of each display unit, and sealing the one or more cells of each display unit subsequent to filling the plurality of second-type particles into the one or more cells of each display unit.

In one embodiment, the plurality of first-type particles is colorless or in a color of white prior to filling the solution into the one or more cells of each display unit. In another embodiment, the plurality of first-type particles is in a color of red, green, blue, cyan, magenta, yellow, or black, subsequent to filling the solution into the one or more cells of each display unit.

In one embodiment, the plurality of second-type particles is in a color of white or black.

In one embodiment, the plurality of first-type particles has a charge polarity opposite to that of the plurality of second-type particles.

In one embodiment, filling the solution into the one or more cells of each display unit is performed with printing, coating, casting, deposition, impregnation, spraying, or combinations thereof. Preferably, filling the solution into the one or more cells of each display unit is performed with inkjet printing.

In one embodiment, the plurality of first-type particles comprises a UV stabilizer or an anti-oxidant.

In a further aspect of the present invention the method includes filling a plurality of first-type particles into the one or more cells of each display unit, filling one or more solutions into the one or more cells of each display unit, respectively, so that each cell contains one of the one or more solutions, wherein each of the one or more solutions comprises a respective colorant, and wherein the respective colorant in each cell reacts with or adsorbs on the first-type particles therein, and filling a plurality of second-type particles into the one or more cells of each display unit. The respective colorant comprises a respective color precursor.

In one embodiment, the method includes sealing the one or more cells of each display unit subsequent to filling the plurality of second-type particles into the one or more cells of each display unit. In another embodiment, the method includes removing the one or more solutions prior to filling the plurality of second-type particles into the one or more cells of each display unit, and sealing the one or more cells of each display unit subsequent to filling the plurality of second-type particles into the one or more cells of each display unit.

In one embodiment, filling the one or more solutions into the one or more cells of each display unit is performed with printing, coating, casting, deposition, impregnation, spraying, or combinations thereof. Preferably, filling the one or more solutions into the one or more cells of each display unit is performed with inkjet printing.

In one embodiment, filling the one or more solutions into the one or more cells of each display unit comprises filling each of the one or more solutions into a corresponding one of the one or more cells of each display unit simultaneously or individually.

In one embodiment, the plurality of first-type particles is colorless or in a color of white prior to filling the one or more solutions into the one or more cells of each display unit. In another embodiment, the plurality of first-type particles is in a color of red, green, blue, cyan, magenta, yellow, or black, subsequent to filling the one or more solutions into the one or more cells of each display unit.

In one embodiment, the plurality of first-type particles has a charge polarity opposite to that of the plurality of second-type particles.

In one embodiment, the plurality of first-type particles comprises a UV stabilizer or an anti-oxidant.

In one embodiment, the plurality of second-type particles is in a color of white or black.

In one embodiment, the one or more solutions comprise a first solution containing a first colorant.

In another embodiment, each display unit comprises at least two cells, wherein the one or more solutions comprise a first solution and a second solution containing a first colorant and a second colorant, respectively. The first and second colorants comprise first and second color precursors, respectively.

In yet another embodiment, each display unit comprises at least three cells, and the one or more solutions comprise a first solution, a second solution and a third solution containing a first colorant, a second colorant and a third colorant, respectively. The first, second and third colorants comprise first, second and third color precursors, respectively.

In a further embodiment, each display unit comprises at least four cells, the one or more solutions comprise a first solution, a second solution, a third solution and a fourth solution containing a first colorant, a second colorant, a third colorant and a fourth colorant, respectively. The first, second, third and fourth colorants comprise first, second, third and fourth color precursors, respectively.

In one embodiment, the method further includes filling a charge controlling solution containing a charge controlling agent into the one or more cells of each display unit such that the charge controlling agent reacts with or adsorbs on the plurality of first-type particles.

In one embodiment, the charge polarity of the plurality of first-type particles is opposite to that of the plurality of second-type particles subsequent to filling the charge controlling solution into the one or more cells of each display unit.

In one embodiment, filling the charge controlling solution into the one or more cells of each display unit is performed with printing, coating, casting, deposition, impregnation, spraying, or combinations thereof. Preferably, filling the charge controlling solution into the one or more cells of each display unit is performed with inkjet printing.

In one embodiment, the method also includes sealing the one or more cells of each display unit subsequent to filling the charge controlling solution. In another embodiment, the method includes removing the one or more solutions and the charge controlling solution from the one or more cells of each display unit after the charge controlling agent reacts with or adsorbs on the plurality of first-type particles; and sealing the one or more cells of each display unit.

In one embodiment, the plurality of first-type particles are colorless or in a color of white prior to filling the solution into the one or more cells of each display unit and the plurality of second-type particles is in a color of white or black.

In one embodiment, the surface of the second-type particles is non-wettable.

In one aspect, the present invention relates to a method for manufacturing a switchable particle-based display having a plurality of display units spatially arranged in a matrix form, where each display unit comprises a plurality of cells.

In one embodiment, the method includes filling a plurality of first-type particles into the plurality of cells of each display unit, filling a first solution comprising a first colorant into a first part of the plurality of cells of each display unit such that the first colorant in the first part of the plurality of cells of each display unit reacts with or adsorbs on the first-type particles therein, and filling a plurality of second-type particles into the plurality of cells of each display unit.

In one embodiment, the method further comprises removing the first solution from the first part of the plurality of cells of each display unit prior to filling the plurality of second-type particles into the plurality of cells of each display unit, and sealing the plurality of cells of each display unit subsequent to filling the plurality of second-type particles into the plurality of cells of each display unit.

In another embodiment, the method further comprises sealing the plurality of cells of each display unit subsequent to filling the plurality of second-type particles into the plurality of cells of each display unit.

In one embodiment, the plurality of first-type particles is colorless or in a color of white prior to filling the first solution into the first part of the plurality of cells of each display unit.

In one embodiment, the plurality of second-type particles is in a color of white or black.

In one embodiment, the plurality of first-type particles has a charge polarity opposite to that of the plurality of second-type particles.

In one embodiment, filling the first solution into the first part of the plurality of cells of each display unit is performed with printing, coating, casting, deposition, impregnation, spraying, or combinations thereof. Preferably, filling the first solution into the first part of the plurality of cells of each display unit is performed with inkjet printing.

In one embodiment, the plurality of first-type particles is in a color of red, green, blue, cyan, magenta, yellow, or black, subsequent to filling the first solution into the first part of the plurality of cells of each display unit.

Furthermore, prior to filling the plurality of second-type particles into the plurality of cells of each display unit, the method also includes filling a second solution containing a second colorant into a second part of the plurality of cells of each display unit such that the second colorant in the second part of the plurality of cells of each display unit reacts with or adsorbs on the first-type particles therein. In one embodiment, the first-type particles in the first part of the plurality of cells of each display unit and the first-type particles in the second part of the plurality of cells of each display unit are of different colors, subsequent to filling the second solution into the second part of the plurality of cells of each display unit. In one embodiment, the plurality of first-type particles is in a color of red, green, blue, cyan, magenta, yellow, or black subsequent to filling the second solution into the second part of the plurality of cells of each display unit.

Moreover, prior to filling the plurality of second-type particles into the plurality of cells of each display unit, the method also includes filling a third solution containing a third colorant into a third part of the plurality of cells of each display unit such that the third colorant in the third part of the plurality of cells of each display unit reacts with or adsorbs on the first-type particles therein. In one embodiment, the first-type particles in the first part of the plurality of cells of each display unit, the first-type particles in the second part of the plurality of cells of each display unit and the first-type particles in the third part of the plurality of cells of each display unit are of different colors, subsequent to filling the third solution into the third part of the plurality of cells of each display unit. In one embodiment, the plurality of first-type particles is in a color of red, green, blue, cyan, magenta, yellow, or black subsequent to filling the third solution into the third part of the plurality of cells of each display unit.

Additionally, prior to filling the plurality of second-type particles into the plurality of cells of each display unit, the method also includes filling a fourth solution containing a fourth colorant into a fourth part of the plurality of cells of each display unit such that the fourth colorant in the fourth part of the plurality of cells of each display unit reacts with or adsorbs on the first-type particles therein. In one embodiment, the first-type particles in the first part of the plurality of cells of each display unit, the first-type particles in the second part of the plurality of cells of each display unit, the first-type particles in the third part of the plurality of cells of each display unit and the first-type particles in the fourth part of the plurality of cells of each display unit are of different colors, subsequent to filling the fourth solution into the third part of the plurality of cells of each display unit. In one embodiment, the plurality of first-type particles is in a color of red, green, blue, cyan, magenta, yellow, or black subsequent to filling the fourth solution into the fourth part of the plurality of cells of each display unit.

In one embodiment, the plurality of first-type particles comprises a UV stabilizer or an anti-oxidant.

In one embodiment, the first colorant comprises a first color precursor.

According to the present invention, the PBD manufacturing method may have at least one of the following advantages:

(1) Pigment particles having different colors or charges of different densities with different polarities can be provided to complete the formation and fill of pigment particles of different colors having charges of high densities with opposite polarities, thereby reducing manufacturing time and costs.

(2) Adapted for both the color electrophoretic displays and the color dry powder type displays, and the color displaying forms thereof can be full color, bi-color or area color.

(3) The pigment particles are colored after filling of the particles, and some of the pigment particles are configured to have special reaction selectivity for selectively reacting or bonding with only specific colorants (or its precursors and derivatives) so that some particles react with the specific colorants to change color, while the other pigment particles do not react with the colorants, thereby maintaining the color. This simplifies the formation process of the color pigment particles, thereby reducing costs. Further, the pigment particles of different colors would not mix together during the filling process to cause color deviation.

(4) The pigment particles are charged after filling of the particles, and some of the pigment particles are configured to have chemical inert surface reaction characteristics, while the other is configured to have reaction selectivity, such that when they are in contact with the charge controlling agent, the pigment particles with the reaction selectivity react with the charge controlling agent, while the other pigment particles do not react with the charge controlling agent because of the chemical inert surface reaction characteristics. Therefore, in the particle filling process, no particle aggregation occurs, which enables the pigment particles to be filled uniformly in the cells.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
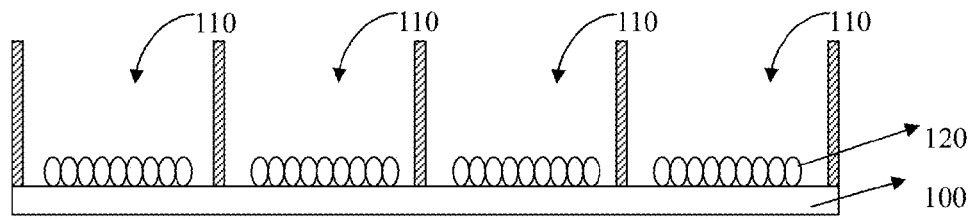
FIG. 1 shows schematically a method of fabricating a switchable color PBD according to one embodiment of the present invention.
Figure 1:
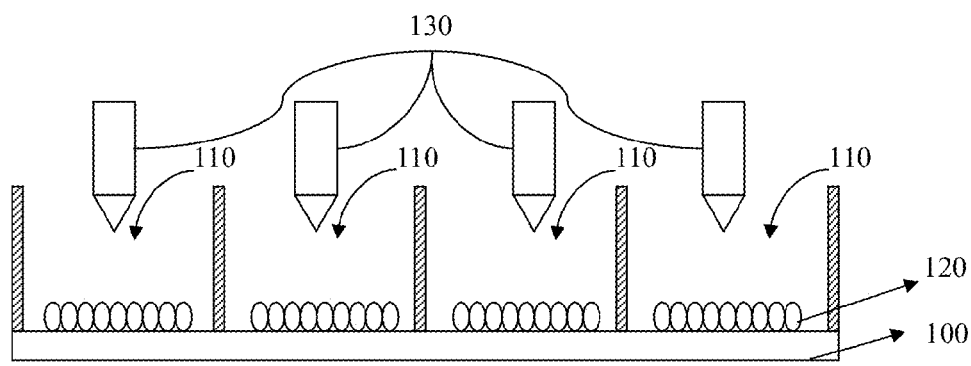
Figure 1:
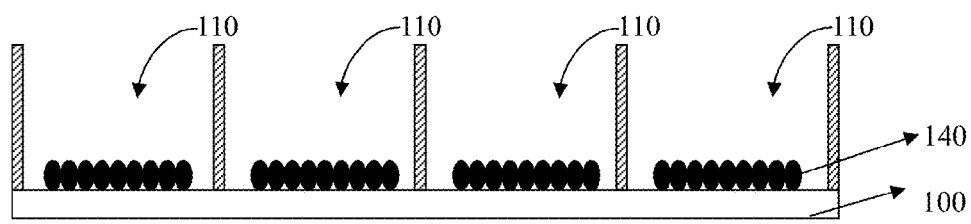
Figure 1:
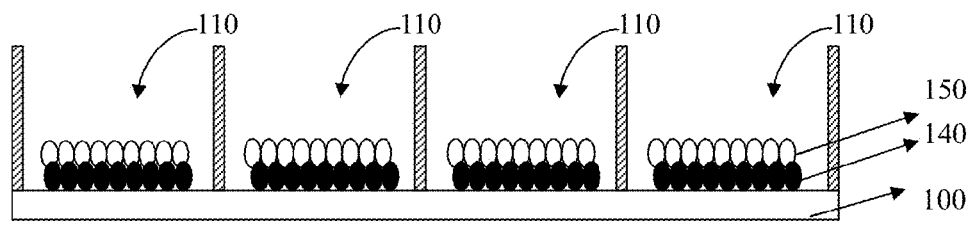
Figure 1:
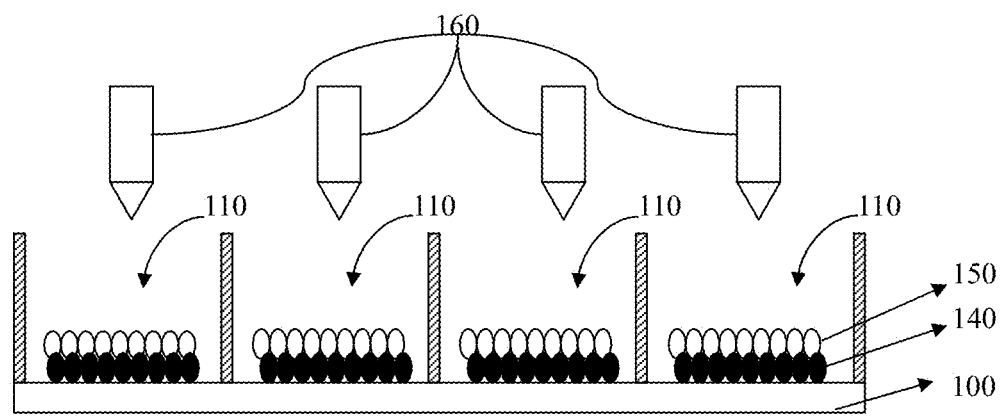
Figure 1:
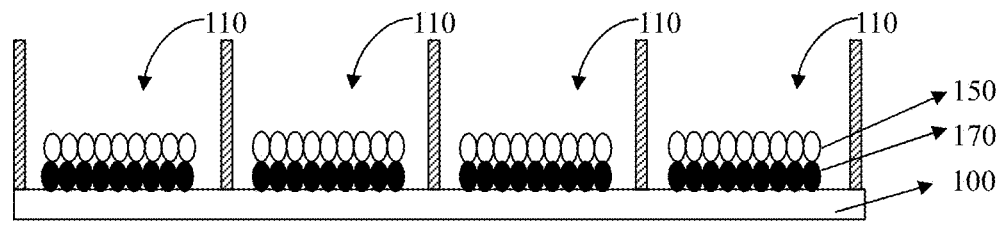
Figure 1:
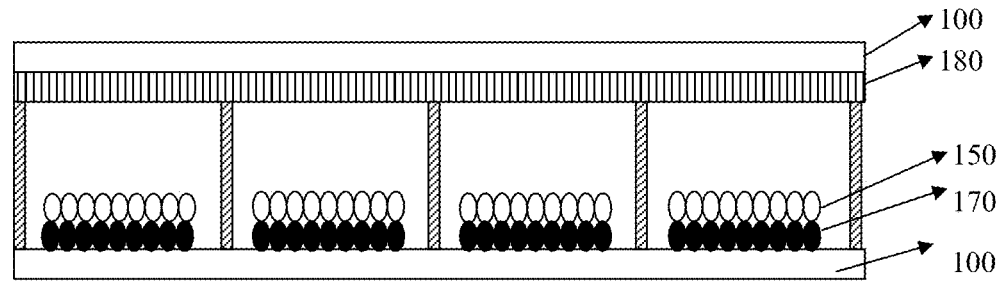

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top" and "front" or "back" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper" depending of the particular orientation of the FIGURE. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

As used herein, the terms "display cell" and "cell" are synonyms and refer to a smallest addressable screen unit of a display. The terms "display unit" and "unit" are synonyms and refer to an addressable screen unit of a display that includes one or more cells. The terms "pigment particles" and "particles" are synonyms and refer to particle used to be filled in the display cells.

OVERVIEW OF THE INVENTION

The description will be made as to the embodiments of the present invention in conjunction with the accompanying drawing in FIG. 1. In accordance with the purposes of this invention, as embodied and broadly described herein, this invention, in one aspect, relates to a switchable color PBD and methods of manufacturing the same.

In the conventional color PBDs, whether it is an electrophoretic PBD, or dry powder type PBD, the color filter is required for color image displaying. The manufacturing process of the color filter is highly complicated and sophisticated, resulting in high manufacturing cost of the color microcapsule electrophoretic display that cannot be reduced. Also, the design of the microcapsule electrophoretic display is restricted due to the existence of the color filter in the display structure. Further, the color filter reduces reflectivity of light from the environmental light source so that the color saturation of the display is reduced. If the color pigment particles can be used to display color images without the color filter, the cost and size the PBD can significantly be reduced. Accordingly, formation of the color pigment particles has become the key technology of the PBD.

Currently, color pigment particles are generally formed by chemical synthesis or pulverization. In the chemical synthesis method, the monomer, the colorants, the initiator and the charge controlling agent are mixed in a proper reacting environment for polymerization to form the color pigment particles, where the polymerization includes, but not limited to, an emulsion polymerization, suspension polymerization, and dispersion polymerization. However, the chemical structure of the colorants and the charge controlling agent generally contains a functional group with a rapid response and reaction selectivity or ionicity, and may participate in and complicate the polymerization. Thus, the pigment particles formed may have a wider range distribution of the particle diameter and non-uniformity of shape, thereby reducing or eliminating the production of the particles. In addition, the colorants and the charge controlling agent have relatively larger particles, which are more difficult to disperse or dissolve in the solutions, and thus difficult to be uniformly coated or distributed among the particles. Thus, the color pigment particles formed may have non-uniformity of color or charge distribution, thereby increasing the difficulties of forming color pigment particles by the chemical synthesis method.

In the pulverization method, the polymer resin, the charge controlling agent and the colorants are mixed and added in a twin screw extruder to make composite resin therewith by polymer compounding or polymer blending, which is then pulverized to powder by pulverization to form the color pigment particles. In the polymer compounding process, the colorants and the charge controlling agent may not be uniformly distributed in the resin, and the high temperature environment may destroy the structures of the colorants and the charge controlling agent. Thus, the color pigment particles formed may have non-uniformity of color or charge distribution. Further, the pigment particles formed by pulverization may have a wider range distribution of the particle diameter, non-uniformity of shape and rough surfaces, thereby increasing the particle aggregation and difficulties to control the movement of the pigment particles in the air or the solutions. The uniformity of the particle size and shape can be achieved by classification of particle diameter and rounding, but the particle yield is thus reduced, thereby increasing the production cost.

Other than the characteristics of uniformity of the particle size, mechanical strength, heat resistance and drivability of electricity field, a key factor of the color pigment particles of the PBD is the capability of color display of the particles, which is mainly affected by the colorants combined with the particles. Currently, the most used colorants include disperse type colorant and reaction type colorant. The disperse type colorant must be distributed uniformly in the material to perform color display, and must be added before the material is formed with its shape, thereby reducing the mechanical strength and increasing difficulties in the manufacturing process. In contrast, the reaction type colorant is more widely used because it can be added to the material after the material is formed with shape or manufactured to perform poststaining, and the color can be displayed with the surface of the material fully combined with the colorant, thereby reducing the amount of colorant.

Among the different types of reaction type colorant, azo dye is a dye widely used in textile dyeing and plastic dyeing, where the amine and nitrite in the chemical structure thereof react to generate diazonium salt, which is then combined with aromatic compounds, such as benzene, phenol, naphthalene or its derivatives, to form azo bonds and to display the color.

The azo dye has low toxicity and light fastness and can be used in coating and pigment materials. The manufacturing process of the azo dye includes forming of diazonium salt (diazotiation) and coupling reaction. The diazonium salt has a rapid response and reaction selectivity, and does not react to other functional groups or generate adverse reactions so that it has high production yield and is commercially advantageous. In control of color thereof, the azo dye generated may have different color by changing the substituent of the aromatic compound or its derivatives. For example, a red azo dye is obtained when the diazonium salt is combined with naphthalene-2-ol, and a green azo dye is obtained when the diazonium salt is mixed with 2-amino-4-methylthiazole and N,N-β-cyanoethyl-ethylaniline. Conditions for the diazonium salt to form azo bonding with different reacting materials are similar, and the same reaction may be used to form different color dyes including the additive primary RGB colors to simplify the manufacturing process thereof. Further, the ingredients are colorless before the reaction of the diazonium salt and the aromatic compound or its derivatives, so any remaining non-reactive ingredients would not affect the capability of color display of the dye. In addition, the reactive substituent of the dye may combine with the specific functional group of the material to form a static bonding between the dye and the material, thereby enhancing the color fastness. By changing the substituent, the color of the azo dye and the dispersing material may be adjusted, thereby controlling dispersity of the dye in different solutions.

On the other hand, the disperse type colorant is distributed uniformly in the material to display the color, and can be used to dye materials where the chemical structure thereof does not have a reactive functional group and is chemically inert, such as polyethylene and polypropylene. Further, reactive functional groups can be added to the structure of the disperse type colorant without changing its capacity of color display so that the disperse type colorant has characteristics similar to reaction type colorant. For example, phthalocyanine compound and its derivatives (such as copper phthalocyanine), a macrocyclic compound formed with ingredients of phthalic acid derivatives containing amine or amide, is a widely used disperse type colorant in the industry, where its major displaying color includes blue and green, and can be adjusted by changing the type of the central coordination covalent-chelated transition metal ion and the substituent on the ring structure. For example, if the hydrogen atom on the ring structure of the phthalocyanine compound is substituted by the chlorine atom, the phthalocyanine compound displays the green color and is called phthalocyanine green.

Currently, the phthalocyanine compound and its derivatives are widely used in textile dyeing, paint pigment, package materials and paper industries. However, the chemical structure of the phthalocyanine compound and its derivatives does not have a reactive functional group thereon, and has low dissolutibility in the solvent. This problem can be solved by substituting the hydrogen atom or the substituent on the structure thereof to increase the dissolutibility and reactivity without changing the capability of color display. A commonly used method to substitute the hydrogen atoms on the benzene ring structure is to use electrophilic reagents (atomic groups with positive electrons) to perform electrophilic aromatic substitution (EAS) to substitute the hydrogen atoms on the benzene ring. For example, with the catalysis of iron chloride, a reaction with halogen (for example, chloride) may substitute the hydrogen atoms on the benzene ring to the halogen atoms, and such reaction is called halogenation. A reaction with sulfuric acid or fuming sulfuric acid may substitute the hydrogen atoms on the benzene ring to the sulfonic acid groups, and such reaction is called sulfonation. A reaction with nitric acid may substitute the hydrogen atoms on the benzene ring to the nitro groups, and such reaction is called nitration. A reaction with alkyl chloride, with the catalysis of $AlCl_3$, may substitute the hydrogen atoms to alkyl, and such reaction is called Friedel-Crafts alkylation. A reaction with cyclic anhydride (for example, succinic anhydride) may substitute the hydrogen atoms to the atom groups containing carboxylic acid, and such reaction is called Friedel-Crafts acrylation. Through the aforementioned EAS, the irreactive hydrogen atoms on the benzene ring structure of the phthalocyanine compound and its derivatives can be partly substituted by the more reactive functional groups, thereby increasing reactivity and disolutibility of the phthalocyanine compound, and the chemical structure thereof can be adjusted to provide with rapid response and reaction selectivity, which is similar to the reaction type colorant.

By the aforementioned reaction, a part of the hydrogen atoms on the benzene ring structure of the phthalocyanine compound and its derivatives can be substituted by the more reactive functional groups. However, the functional groups are still relatively irreactive. Thus, if the functional groups can be further substituted by functional groups with more rapid response and reaction selectivity, such as amine, carboxylic acid, acid chloride, the phthalocyanine compound and its derivatives may have the characteristics similar to the reaction type colorant.

Generally, a commonly used method to dispose amine on the benzene ring is to perform hydrogenation so that the nitro groups on the benzene ring become amine in the reaction of iron and hydrochloric acid. For carboxylic acid, potassium permamanganate can be used so that the alkyl on the benzene ring is oxidized to become carboxylic acid. Carboxylic acid may then react with thionyl chloride or phosphorous trichloride to become acid chloride. The acid chloride such a functional group is known to have the high reactivity of functional groups, which, with the amine, can form a stable amide, and with hydroxyl, can form ester. These bonds are produce with no need of special reaction conditions and catalysts. Accordingly, the acid chloride functional groups may be introduced into the structure of the phthalocyanine compound and its derivatives to increase the reactivity of the phthalocyanine compound. Similarly, if the acid chloride functional groups may be introduced into the material structure, rapid reaction to specific functional groups can be achieved, and the material may react to colorant having the specific functional groups to form the bonding and display the color. In addition to the above functional groups having better reactivity, there are some functional groups of which the reactivity is presented in certain specific reactive groups, such as a hydroxyl group. The reactivity of the hydroxyl functional groups is relatively lower than that of amino and carboxylic acid, but the hydroxyl functional group is highly reactive with the alkoxysilyl functional group in silane. Therefore, the property can also be applied in the design of the chemical structure of the colorant.

In addition to the phthalocyanine compound and its derivatives, other disperse type colorant can be applied with the similar functional group adjustment to the chemical structure thereof to provide with characteristics similar to the reaction type colorant.

In addition to the combination of the colorant and the particles, the capability of color display of the color pigment particles is also determined by the light fastness of the pigment particles. Generally, PBD is thin and light weighted, and dissipation of heat generated thereby is more difficult. Further, the PBD displays the image and color by reflecting light from the environment, so the pigment particles exist in an operation environment that accumulates heat and is under the environment light exposure, which contains high energy ultraviolet (UV) light, for a long time. The pigment particles are made of polymer materials, and the colorant used contains light sensitive functional groups for the capacity of color display, thereby absorbing a part of the energy of the UV light. Most of the light sensitive functional groups have unsaturated conjugated double bonding structures, and accumulation of the energy of the UV light for a long time may result in decomposition or deterioration of the polymer or colorant structure, thereby deforming or destroying the pigment particles, and reducing the capability of image and color display of the particles. Accordingly, increasing the light fastness of the pigment particles has become another key factor for the capability of color display.

UV stabilizer and anti-oxidant are additives used for increasing the light fastness of the polymer. By being exposed to and absorbing energy of the UV light, the additives decompose and generate free radicals, thereby preventing the polymer material or the colorant from further deterioration and increasing the light fastness of the material. Commonly used UV stabilizer includes compounds of salicylate, benzophenone, benzotriazole and hindered amine, and the light fastness of the particles may be increased by properly introducing corresponding ingredients thereto, thus increasing the life of the PBD.

In addition to the capability of color display, the pigment particles are charged with sufficient charge density to move around according to the varied external electric fields imposed thereon. However, the display units are filled with two types of pigment particles having charges of opposite polarities, thereby creating difficulties in the filling process. If the two types of the pigment particles are mixed and filled simultaneously, the particle aggregation will occur during the filing process because of the attraction between the pigment particles of opposite polarities, which makes filling the pigment particles uniformly in the display cells very difficult. If they are filled sequentially, the known filling process such as electrostatic powder coating cannot be used effectively in filling of the second type pigment particles, thus making filling difficult and reducing the product yield.

If the two types of pigment particles are charged to carry different charge densities, particle aggregation can be reduced or eliminated, and the current filling process can be used to fill the particles into the display units. By interacting with the colorant and a charge controlling agent (e.g., through chemical reaction or physical adsorption), the filled pigment particles with the lower charge density are then charged inside the cells to carry charges of high density with a polarity opposite to that of the pigment particles with the higher charge density. As such, the two types of pigment particles having high charge density with opposite polarities are filled uniformly in the cells.

To achieve the aforementioned objectives, the pigment particles are configured to have desired surface characteristics. For example, the pigment particles of the first color carrying the high density charges are non-wettable particles and have chemically inert surface reaction characteristics, which make the carried high density charges more stable and reduce the loss of the same during the other processes. For the pigment particles of the second color carrying no charge or the low density charges, their surfaces are wettable and have functional groups with special reaction selectivity. They are then charged to have a high charge density, or colored in, e.g., black, white, red, green, blue, cyan, magenta, yellow, or other color, by chemical reaction or physical adsorption.

Lowering surface energy results in enhancement of the non-wettability and chemical inertness of a material surface. Generally, the surface of a material is categorized in hydrophilic or hydrophobic. If the surface is hydrophilic, the material has a tendency to interact with water and other polar substances, while to be repelled from oil. That is the affinity of the material to an oil-based solvent is relatively poor. The hydrophilic material thus has a better oil-based solvent repellency. On the other hand, if the surface is hydrophobic, the material tends to be non-polar and thus prefer other neutral molecules and non-polar solvents and has a tendency to be repelled from water. Accordingly, the hydrophobic material has high resistance to a polar substance. Such a material can have both hydrophobic and oleophobic properties, and thus no chemical reaction and physical adsorption can easily occur on its surface, which makes it the excellent chemical inert material.

Currently, the most well-known low surface energy material is polytetrafluoroethylene (PTFE), where its surface energy is about 22 mJ/m$^2$. Applications of PTFE include, for example, water-repellent surface coating and stain/corrosion prevention. In addition, PTFE is not easy to be processed and has a low oil-repellency, which limits its applications. In order to overcome the shortcomings of PTFE, other low surface energy materials have recently been developed, which include fluorinated resin and polysiloxane polymer. The mechanisms of lowering the surface energies of these materials are different. For the fluorinated resin, it uses the C—F bonds to effectively reduce the surface energy by introducing a large number of fluorine atoms in the structure. In addition, the surface energy of the fluorinated resin can also be lowered by modifying its physical structure, such as: increasing its surface roughness, reducing its surface crystallinity, and including a comb-like structure. Besides PTFE, the fluorinated resin also includes poly(perfluoroalkylacrylate) (PFA) series of fluorinated acrylic resin, which its surface energy lowers as increasing the rate of fluorine atoms in the structure. Having its main chain structure soft and its fluorine groups in the side chains, the surface energy can be reduced to about 5 mJ/m$^2$, which makes the PFA series excellent hydrophobic and oleophobic materials. For the polysiloxane polymer, it mainly utilizes increasing the surface roughness of the microstructure to lower the surface energy, so as to have both hydrophobic and oleophobic properties. Polydimethylsiloxane is one of such a material. Moreover, non-fluorinated and non-silicon, low surface energy materials, such as Polybenzoxazine (PBZ), are also available. The surface energy of PBZ can be reduced by thermal treatments and changing the state of the crystalline surface and the force of intermolecular hydrogen bonds.

Therefore, pigment particles with its surfaces having both hydrophobic and oleophobic properties and the chemical inertness can be obtained by combining the surfaces of the pigment particles with a low surface energy material through surface processing technologies, without changing its charge density and polarity and capability of color display. As to change the charge density and polarity of pigment particles, the surface structure of such pigment particles needs to be wettable and has a special functional group with a rapid response and reaction selectivity. By interacting with a charge controlling agent and the colorant, the pigment particles can be charged to carry high density charges without changing its capability of color display. Among many functional groups, acid chloride is one of highly reactive functional groups, can be obtained via the preparation of carboxylic acid with thionyl chloride or phosphorus trichloride. Such a functional group is known to have the high reactivity of functional groups, which, with the amine, can form a stable amide, and with hydroxyl, can form ester. These bonds are produce with no need of special reaction conditions and catalysts. In addition to the above functional groups having better reactivity, there are some functional groups of which the reactivity is presented in certain specific reactive groups, such as a hydroxyl group. The reactivity of the hydroxyl functional groups is relatively lower than that of amino and carboxylic acid, but the hydroxyl functional group is highly reactive with the alkoxysilyl functional group in silane. Therefore, the property can also be applied in the design of the chemical structure of the surface of pigment particles so as to make the pigment particles to have reactivity and selectivity.

Further, to display color image with color pigment particles, a plurality of groups of pigment particles (formed by pigment particles of specific colors, such as R, G, B, C, M, Y, and the particles of the contrasting color, generally white or black particles) are sequentially filled in the respectively separate and independent display cells. For example, if the additive primary RGB colors are used for color image display, a display unit would be formed by three display cells, and three groups of red/white, green/white and blue/white pigment particles are sequentially filled in the respectively separate and independent display cells, with each display cell having only one group of pigment particles. Alternatively, to achieve color image display with better contrast, the display unit can be formed by four display cells, and four groups of red/white, green/white, blue/white and black/white pigment particles are sequentially filled in the respectively separate and independent display cells, with each display cell having only one group of pigment particles. If, during the sequential filling process, the groups of pigment particles are accidentally mixed and filled in the wrong display cells, color deviation exists. This problem can be solved by sealing off the display cells not filled in the sequential filling process to prevent from mixing of the groups of pigment particles. However, additional sealing and opening process for the display cells are then required, thereby increasing the complexity of the particle filling process. Further, the two types of pigment particles are charged with opposite polarities, and if the two types of the pigment particles are mixed and filled simultaneously, the particle aggregation will occur during the filing process because of the attraction between the pigment particles of opposite polarities, which makes filling the pigment particles uniformly in the display cells very difficult and reduces the product yield. By reducing the charge densities of the pigment particles, particle aggregation can be reduced or eliminated, but the sensitivity of the particles driven by the electric field is also reduced, resulting in slow response and high driving voltage to drive the pigment particles.

Generally, the color PBD is categorized with three types of different display unit structures, including full color display, bi-color display and area color display. In the full color display PBD, a plurality of display units are formed so that the whole area of the display may perform color display. Each display unit includes three separate and independent display cells arranged regularly, with each display cell being filled with one group of pigment particles carry charges of opposite polarities to display the required color. For example, in one embodiment where the additive primary RGB colors are used for color image display, three groups of red/white (R/W) (or red/black, R/K), green/white (G/W) (or green/black, G/K) and blue/white (B/W) (or blue/black, B/K) pigment particles are sequentially filled in the three display cells of each display unit in the regular arrangement. In an alternative embodiment, to achieve color image display with better contrast, the display unit can be formed by four display cells, and four groups of red/white (R/W) (or red/black, R/K), green/white (G/W) (or green/black, G/K), blue/white (B/W) (or blue/black, B/K) and black/white (K/W) pigment particles are sequentially filled in the four display cells of each display unit in the regular arrangement. In another embodiment where the three colors of cyan, yellow and magenta (CYM) are used for color image display, three groups of cyan/black (C/K) (or cyan/white, C/W), yellow/black (Y/K) (or yellow/white, Y/W), and magenta/black (M/K) (or magenta/white, M/W) pigment particles are sequentially filled in the three display cells of each display unit in the regular arrangement. In an alternative embodiment, to achieve CYM color image display with better contrast, the display unit can be formed by four display cells, and four groups of cyan/black (C/K) (or cyan/white, C/W), yellow/black (Y/K) (or yellow/white, Y/W), magenta/black (M/K) (or magenta/white, M/W) and black/white (K/W) pigment particles are sequentially filled in the four display cells of each display unit in the regular arrangement. After filling of the pigment particles, the display units are packed and disposed between the electrodes, and by the electric field generated by the electrodes, the particles can be controlled to achieve full color display.

In the bi-color display PBD, a plurality of display units are formed so that the whole area of the display may display two different colors (not including background color). Each display unit includes two separate and independent display cells arranged regularly, with each display cell being filled with one group of pigment particles carry charges of opposite polarities to display the required color. For example, in one embodiment where the red (R) and blue (B) colors are used for display, two groups of red/white (R/W) (or red/black, R/K) and blue/white (B/W) (or blue/black, B/K) pigment particles are sequentially filled in the two display cells of each display unit in the regular arrangement. After filling of the pigment particles, the display units are packed and disposed between the electrodes, and by the electric field generated by the electrodes, the particles can be controlled to achieve bi-color display.

In the area color display PBD, a plurality of display units are formed so that the display is separated to areas, with each area displaying only one color (not including background color). The display cells of each display unit are filled with one group of pigment particles carry charges of opposite polarities to display the required color. For example, in one embodiment where the red (R) and green (G) colors are used for an area color display, the group of red/white (R/W) (or red/black, R/K) pigment particles is filled in the display cells of each display unit in the area displaying the red color, and the group of green/white (G/W) (or green/black, G/K) pigment particles is filled in the display cells of each display unit in the area displaying the green color. After filling of the pigment particles, the display units are packed and disposed between the electrodes, and by the electric field generated by the electrodes, the particles can be controlled to achieve area color display.

It is therefore the object of the present invention to provide a color PBD manufacturing method to overcome the shortcomings. The switchable PBD has a plurality of display units spatially arranged in a matrix form. Each display unit has one or more cells. Each cell comprises compartment, microcup, microgrid, or partition structure.

In one aspect of the invention, the first-type particles, which can be colorless or in a color of white and has wettability, reaction selectivity and light fastness, are filled in the respectively independent display cells of the display units. Then colorant solutions are respectively filled into the display cells, preferably by ink jet printing, such that each cell contains one of the colorant solutions. The colorants react with the first-type particles so that the first-type particles in different cells display different colors. Next, the second-type particles, which can be in a color of black or white, are filled into the respective display cells. Accordingly, the formation and fill of the color pigment particles in the cells are completed. The display units are then sealed between two substrates with electrodes. As such, when different voltages are applied onto the electrodes, electric fields are generated therebetween, and the color pigment particles will move accordingly, thereby achieving color image displaying.

In one embodiment, the display unit sealing process is performed after the solution is evaporated from the cells. In this case, the remaining solution is evaporated from the cells before sealing the cells, thereby obtaining the dry powder type color pigment particles. The display units are then sealed between two substrates with electrodes. As such, when different voltages are applied onto the electrodes, electric fields are generated therebetween, and the dry power type color pigment particles will move accordingly, thereby achieving color image displaying.

In another aspect, the first-type particles, which can be colorless or white and has wettability, reaction selectivity and light fastness, are filled in the respectively independent display cells of the display units. Secondly, colorant solutions are respectively filled into the display cells, preferably by ink jet printing, such that each cell contains one of the colorant solutions. The colorants react with the first-type particles so that the first-type particles in different cells display different colors. Then, the second-type particles, which can be in a color of black or white, are filled into the respective display cells. The second-type particles include non-wettable particles having chemical inertness and carrying charges with a high charge density. Then a charge controlling agent solution is filled into the display cells, preferably by ink jet printing. The charge controlling agent has reaction selectivity and a charge polarity opposite to that of the second-type particles. Under certain conditions, the charge controlling agent chemically reacts with the first-type particles. Consequently, the first-type particles are charged with a high charge density and a charge polarity same as that of the charge controlling agent but opposite to that of the second-type particles. Thus, the formation and fill of the color pigment particles in the cells are completed. The display units are then sealed between two substrates with electrodes. As such, when different voltages are applied onto the electrodes, an electric field is generated therebetween, and the color pigment particles will move accordingly, thereby achieving color image displaying.

In one embodiment, the display unit sealing process is performed after the solution is evaporated from the cells. In this case, the remaining solution is evaporated from the cells before sealing the cells, thereby obtaining the dry powder type color pigment particles. The display units are then sealed between two substrates with electrodes. As such, when different voltages are applied onto the electrodes, electric fields are generated therebetween, and the dry power type color pigment particles will move accordingly, thereby achieving color image displaying. The process will produce a dry powder type PBD.

Specifically, in one aspect of the invention, the method for manufacturing a switchable particle-based display having a plurality of display units spatially arranged in a matrix form where each display unit have one or more cells includes filling a plurality of first-type particles into the one or more cells of each display unit, filling one or more solutions into the one or more cells of each display unit, respectively, so that each cell contains one of the one or more solutions, where each of the one or more solutions comprises a respective colorant, and wherein the respective colorant in each cell reacts with or adsorbs on the first-type particles therein, and filling a plurality of second-type particles into the one or more cells of each display unit. The respective colorant comprises a color precursor.

The method further includes sealing the one or more cells of each display unit subsequent to filling the plurality of second-type particles into the one or more cells of each display unit, thereby forming an electrophoretic type PBD. The method may includes removing the solution prior to filling the plurality of second-type particles into the one or more cells of each display unit, and sealing the one or more cells of each display unit subsequent to filling the plurality of second-type particles into the one or more cells of each display unit, thereby forming a dry powder type PBD.

The step of filling the one or more solutions into the one or more cells of each display unit is performed with printing, coating, casting, deposition, impregnation, spraying, or combinations thereof, and preferably, with inkjet printing.

Additionally, the step of filling the one or more solutions into the one or more cells of each display unit includes filling each of the one or more solutions into a corresponding one of the one or more cells of each display unit simultaneously or individually.

In one embodiment, the one or more solutions comprise a first solution containing a first colorant.

In another embodiment, each display unit comprises at least two cells, wherein the one or more solutions comprise a first solution and a second solution containing a first colorant and a second colorant, respectively. The first and second colorants comprise first and second color precursors, respectively.

In yet another embodiment, each display unit comprises at least three cells, and the one or more solutions comprise a first solution, a second solution and a third solution containing a first colorant, a second colorant and a third colorant, respectively. The first, second and third colorants comprise first, second and third color precursors, respectively.

In a further embodiment, each display unit comprises at least four cells, the one or more solutions comprise a first solution, a second solution, a third solution and a fourth solution containing a first colorant, a second colorant, a third colorant and a fourth colorant, respectively. The first, second, third and fourth colorants comprise first, second, third and fourth color precursors, respectively.

In one embodiment, the plurality of first-type particles is colorless or in a color of white prior to filling the one or more solutions into the one or more cells of each display unit. In another embodiment, the plurality of first-type particles is in a color of red, green, blue, cyan, magenta, yellow, or black, subsequent to filling the one or more solutions into the one or more cells of each display unit. In one embodiment, the plurality of first-type particles comprises a UV stabilizer or an anti-oxidant.

In one embodiment, the plurality of second-type particles is in a color of white or black.

Furthermore, the method may include filling a charge controlling solution containing a charge controlling agent into the one or more cells of each display unit such that the charge controlling agent reacts with or adsorbs on the plurality of first-type particles.

In one embodiment, the charge polarity of the plurality of first-type particles is opposite to that of the plurality of second-type particles subsequent to filling the charge controlling solution into the one or more cells of each display unit.

The step of filling the charge controlling solution into the one or more cells of each display unit is performed with printing, coating, casting, deposition, impregnation, spraying, or combinations thereof. Preferably, filling the charge controlling solution into the one or more cells of each display unit is performed with inkjet printing.

In one embodiment, the method also includes sealing the one or more cells of each display unit subsequent to filling the charge controlling solution. In another embodiment, the method includes removing the one or more solutions and the charge controlling solution from the one or more cells of each display unit after the charge controlling agent reacts with or adsorbs on the plurality of first-type particles; and sealing the one or more cells of each display unit.

In one embodiment, the plurality of first-type particles are colorless or in a color of white prior to filling the solution into the one or more cells of each display unit and the plurality of second-type particles is in a color of white or black. In one embodiment, the surface of the second-type particles is non-wettable.

In another aspect of the invention, a method for manufacturing a switchable particle-based display having a plurality of display units spatially arranged in a matrix form, where each display unit comprises a plurality of cells, includes filling a plurality of first-type particles into the plurality of cells of each display unit, filling a first solution comprising a first colorant into a first part of the plurality of cells of each display unit such that the first colorant in the first part of the plurality of cells of each display unit reacts with or adsorbs on the first-type particles therein, and filling a plurality of second-type particles into the plurality of cells of each display unit.

In one embodiment, the method further comprises sealing the plurality of cells of each display unit subsequent to filling the plurality of second-type particles into the plurality of cells of each display unit, thereby forming an electrophoretic type PBD. In another embodiment, the method further comprises removing the first solution from the first part of the plurality of cells of each display unit prior to filling the plurality of second-type particles into the plurality of cells of each display unit, and sealing the plurality of cells of each display unit subsequent to filling the plurality of second-type particles into the plurality of cells of each display unit, thereby forming a dry powder type PBD.

In one embodiment, the plurality of first-type particles is colorless or in a color of white, prior to filling the first solution into the first part of the plurality of cells of each display unit. In one embodiment, the plurality of second-type particles is in a color of white or black.

In one embodiment, the plurality of first-type particles comprises a UV stabilizer or an anti-oxidant. The plurality of first-type particles may have a charge polarity opposite to that of the plurality of second-type particles.

In one embodiment, filling the first solution into the first part of the plurality of cells of each display unit is performed with printing, coating, casting, deposition, impregnation, spraying, or combinations thereof. Preferably, filling the first solution into the first part of the plurality of cells of each display unit is performed with inkjet printing.

In one embodiment, the plurality of first-type particles is in a color of red, green, blue, cyan, magenta, yellow, or black, subsequent to filling the first solution into the first part of the plurality of cells of each display unit.

Furthermore, prior to filling the plurality of second-type particles into the plurality of cells of each display unit, the method also includes filling a second solution containing a second colorant into a second part of the plurality of cells of each display unit such that the second colorant in the second part of the plurality of cells of each display unit reacts with or adsorbs on the first-type particles therein. In one embodiment, the first-type particles in the first part of the plurality of cells of each display unit and the first-type particles in the second part of the plurality of cells of each display unit are of different colors, subsequent to filling the second solution into the second part of the plurality of cells of each display unit. In one embodiment, the plurality of first-type particles is in a color of red, green, blue, cyan, magenta, yellow, or black subsequent to filling the second solution into the second part of the plurality of cells of each display unit.

Moreover, prior to filling the plurality of second-type particles into the plurality of cells of each display unit, the method also includes filling a third solution containing a third colorant into a third part of the plurality of cells of each display unit such that the third colorant in the third part of the plurality of cells of each display unit reacts with or adsorbs on the first-type particles therein. In one embodiment, the first-type particles in the first part of the plurality of cells of each display unit, the first-type particles in the second part of the plurality of cells of each display unit and the first-type particles in the third part of the plurality of cells of each display unit are of different colors, subsequent to filling the third solution into the third part of the plurality of cells of each display unit. In one embodiment, the plurality of first-type particles is in a color of red, green, blue, cyan, magenta, yellow, or black subsequent to filling the third solution into the third part of the plurality of cells of each display unit.

Additionally, prior to filling the plurality of second-type particles into the plurality of cells of each display unit, the method also includes filling a fourth solution containing a fourth colorant into a fourth part of the plurality of cells of each display unit such that the fourth colorant in the fourth part of the plurality of cells of each display unit reacts with or adsorbs on the first-type particles therein. In one embodiment, the first-type particles in the first part of the plurality of cells of each display unit, the first-type particles in the second part of the plurality of cells of each display unit, the first-type particles in the third part of the plurality of cells of each display unit and the first-type particles in the fourth part of the plurality of cells of each display unit are of different colors, subsequent to filling the fourth solution into the third part of the plurality of cells of each display unit. In one embodiment, the plurality of first-type particles is in a color of red, green, blue, cyan, magenta, yellow, or black subsequent to filling the fourth solution into the fourth part of the plurality of cells of each display unit.

In one embodiment, each of the first, second, third and fourth colorants comprises a respective color precursor that is different from each other.

Referring to FIG. 1, the method for manufacturing a switchable color PBD having a plurality of display units spatially arranged in a matrix form is shown according to one embodiment of the present invention. In the method, the first-type particles are filled in the respectively independent display cells 110 of each display unit, as shown in FIG. 1(A). The surfaces of the first-type particles 120 are wettable, and have reaction selective functional groups, and the particles are colorless or white and have light fastness. Then, the colorant solutions 130 are respectively filled into display cells 110, as shown in FIG. 1(B), so that each cell 110 contains one of the colorant solutions 130. The colorants react with the first-type particles 120 so that the first-type particles 120 in each display cell 110 display a desired color that is corresponding to a color of the colorant therein, so as to become first-type colored particles 140, as shown in FIG. 1(C). Then, the second-type particles 150, which can be in a color of black or white and include non-wettable particles having chemical inertness and carrying charges with a high charge density, are filled into the respective display cells, as shown in FIG. 1(D). In addition, a charge controlling agent solution 160 is filled into the display cells 110 filled with the two types of pigment particles 140 and 150, as shown in FIG. 1(E), preferably by ink jet printing. The charge controlling agent 160 has reaction selectivity and a charge polarity opposite to that of the second-type particles. Due to the design of the particle structures, the charge controlling agent chemically reacts with the first-type particles only. Consequently, the first-type particles are charged with the required charge density and polarity to become the particles with high charge density 170, as shown in FIG. 1(F). The display units are then sealed by the sealing layer 180 between two electrode plates 100. As such, when different voltages are applied onto the electrodes, electric fields are generated therebetween, and the color pigment particles will move accordingly, thereby achieving color image displaying.

In one embodiment, the remaining solution is evaporated from the cells before sealing the cells, thereby obtaining the dry powder type color pigment particles. The display units are then sealed by the sealing layer 180 between two electrode plates 100, as shown in FIG. 1(G). As such, when different voltages are applied onto the electrodes, electric fields are generated therebetween, and the dry power type color pigment particles will move accordingly, thereby achieving color image displaying.

The first-type particles, the second-type particles, the solution, the charge controlling agent, and others are described as below in further details.

In one embodiment, the first-type particles, which can be colorless or white and include non-wettable particles having reaction selectivity, are filled into the cells of the display units. In one embodiment, the process of forming the first-type particles is performed with a pulverization method or a chemical synthesis method. The pulverization method includes, but not limited to, a ball mill, a bead mill, and a jet mill. The chemical synthesis method includes, but not limited to, emulsion polymerization, suspension polymerization, and dispersion polymerization. The material of the pigment particles includes, but not limited to, styrene resin and its derivatives, nylon (polyamide) resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or any mixture of the aforementioned resins and the derivatives. In preferable embodiments, the first-type particles are formed of the styrene resin and/or acrylic resin with a resin ratio of about 98-50%, and preferably about 95-65%. The diameter of the pigment particles can be about 0.01-20 μm, and preferably about 0.1-10 μm. The first-type particles may contain a UV stabilizer, which includes, but not limited to, compounds of salicylate, benzophenone, hindered amine, quinine, nitrobenzene, perylene diimide, aromatic amine, benzotriazole, and the derivatives thereof, or any compounds thereof, with the ratio of about 0-10%, and preferably about 0.1-5%. The listed UV stabilizers are examples only and other UV stabilizers can also be utilized. The first-type particles may contain a charge controlling agent and thus carry charges of a high density. In one embodiment, the ratio of the charge controlling agent is about 0-25%, preferably, about 0-10%. The charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. The listed charge controlling agents are examples only and other charge controlling agents can also be utilized.

After the first-type particles are filled in the cells of each display unit, the colorant solution is filled in the cells so that the colorant reacts to the first-type particles. In one embodiment, the filling of the colorant is performed by printing, coating, casting, deposition, impregnation, or spraying, and preferably by ink jet printing. The colorant can be colorless benzene, naphthalene or polycyclic aromatic compound and its derivatives, and the substituent on the ring includes, but not limited to, hydroxy (OH), amine ($NH_2$), sulfonic acid ($HSO_3$), nitrite ($NO_2$), halogens, cyano (CN), methylsulfonyl, ethylsulfonyl, phenylsulfonyl, carbalkoxy (1 to 4 carbon atoms), carbo-β-alkoxyethoxy (1 to 4 carbon atoms), phenylazophenyl (substituted by chlorine, bromine, nitro, cyano), benzthiazolyl (substituted by cyano, methylsulfonyl, ethylsulfonyl, nitro), benzisothiazolyl (substituted by chlorine, bromine, nitro, cyano), thioazoyl (substituted by cyano and nitro), thienyl (substituted by cyano, methyl and nitro) and thiadiazoyl (substituted by phenyl, methyl, chlorine, bromine, methylmercapto), or aminothiazole and aniline, α-aminonaphthalene, pyridine or indole and the derivatives or compounds thereof. The black colorant includes carbon black, copper oxide, manganese dioxide, aniline black, active carbon, sudan black, derivatives of them, or other compounds in black. The red colorant includes red oxide, permanent red 4R, cadmium red, lithol red, pyrazolone red, lake red D, permanent red F5RK, allura red, alizarin lake, brilliant red, derivatives of them, or other compounds in red. The green colorant includes chrome green, pigment green B, Malachite green lake, chromium oxide, fast green G, derivatives of them, or and other compounds in green. The blue colorant includes phthalocyanine blue, metal free phthalocyanine blue, partial chlorinated phthalocyanine blue, triarylcarbonium, Berlin blue, cobalt blue, alkali blue lake, Victoria blue lake, first sky blue, Indanthrene blue BC, derivatives of them, or other compounds in blue. The yellow colorant includes chrome yellow, yellow iron oxide, naphthol yellow, hansa yellow, benzidine yellow G, benzidine yellow GR, quinoline yellow lake, nickel titanium yellow, cadmium yellow, tartrazinelake, derivatives of them, or other compounds in yellow. The orange colorant includes molybdenum orange, permanent orange GTR, pyrazolone orange, benzidine orange G, Indanthrene brilliant orange RK, Indanthrene brilliant orange GK, Balkan orange, derivatives of them, or other compounds in orange. The purple colorant includes manganese purple, first violet B, fast violet RL, fast violet lake, pigment violet EB, derivatives of them, or other compounds in purple. The listed colorant compositions and their derivatives are examples only and other colorants can also be utilized. In one embodiment, the colorant is soluble or disperseable in solvents. The organic solvents includes alcohols such as methanol, ethanol or other high molecular weight alcohols, ether such as ether, petroleum ether, tetrahydrofuran or ether derivatives, ketone such as methyl ethyl ketone, or ketone derivatives, fluoroinate solvent, halogen solvent such as chloroform, dichloromethane, aromatic solvent such as toluene, p-xylene, carboxylic acid, such as acetic acid, esters such as ethyl acetate, amide such as dimethylacetamide, dimethyl sulfoxide, alkane such as n-hexane, water or any combination of the above. The listed charge controlling agents and solvents are examples only and other charge controlling agents and solvents can also be utilized.

Then, the second-type particles, in a color of black or white and carrying charges with required polarity and charge density, are filled into the cells of the display units. In one embodiment, the process of forming the second-type particles is performed with a pulverization method or a chemical synthesis method. The pulverization method includes, but not limited to, a ball mill, a bead mill, and a jet mill. The chemical synthesis method includes, but not limited to, emulsion polymerization, suspension polymerization, and dispersion polymerization. The material of the pigment particles includes, but not limited to, styrene resin and its derivatives, nylon (polyamide) resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or any mixture of the aforementioned resins and the derivatives. In preferable embodiments, the second-type particles are formed of the styrene resin and/or acrylic resin with a resin ratio of about 98-50%, and preferably about 95-65%. The diameter of the pigment particles can be about 0.01-20 μm, and preferably about 0.1-10 μm. The second-type particles may contain a charge controlling agent, and the ratio of the charge controlling agent is about 0-25%, preferably, about 0-10%. The charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. The listed charge controlling agents are examples only and other charge controlling agents can also be utilized. The second-type particles have a particle size of about 0.01-20 μm, preferably, about 0.1-10 μm, and a charge density in range of about ±0-150 μC/g, preferably, ±15-120 μC/g. Further, the particles can be colored by the colorant having a ratio of about 1-50%, preferably, about 3-40%. In one embodiment, the black colorant includes carbon black, copper oxide, manganese dioxide, aniline black, active carbon, sudan black, derivatives of them, or other compounds in black. The white colorant includes titanium dioxide, zinc oxide, antimony white, zinc sulfide, derivatives of them, or other compounds in white.

Thus, the formation and fill of the color pigment particles in the cells of each display unit are completed. In one embodiment, the remaining solution is evaporated from the cells before sealing the cells, thereby obtaining the dry powder type color pigment particles. The display units are then sealed between two substrates with electrodes. As such, when different voltages are applied onto the electrodes, an electric field is generated therebetween, and the color pigment particles will move accordingly, thereby achieving color image displaying.

In one embodiment, the first-type particles, which can be colorless or white and include non-wettable particles having reaction selectivity, are filled into the cells of the display units. In one embodiment, the process of forming the first-type particles is performed with a pulverization method or a chemical synthesis method. The pulverization method includes, but not limited to, a ball mill, a bead mill, and a jet mill. The chemical synthesis method includes, but not limited to, emulsion polymerization, suspension polymerization, and dispersion polymerization. The material of the pigment particles includes, but not limited to, styrene resin and its derivatives, nylon (polyamide) resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or any mixture of the aforementioned resins and the derivatives. In preferable embodiments, the first-type particles are formed of the styrene resin and/or acrylic resin with a resin ratio of about 98-50%, and preferably about 95-65%. The diameter of the pigment particles can be about 0.01-20 μm, and preferably about 0.1-10 μm. The first-type particles may contain a UV stabilizer, which includes, but not limited to, compounds of salicylate, benzophenone, hindered amine, quinine, nitrobenzene, perylene diimide, aromatic amine, benzotriazole, and the derivatives thereof, or any compounds thereof, with the ratio of about 0-10%, and preferably about 0.1-5%. The listed UV stabilizers are examples only and other UV stabilizers can also be utilized. The first-type particles may contain a charge controlling agent and thus carry charges of a high density. In one embodiment, the ratio of the charge controlling agent is about 0-25%, preferably, about 0-10%. The charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. The listed charge controlling agents are examples only and other charge controlling agents can also be utilized.

After the first-type particles are filled in the cells of each display unit, the colorant solution is filled in the cells of each display unit so that the colorant reacts to the first-type particles. In one embodiment, the filling of the colorant is performed by printing, coating, casting, deposition, impregnation, or spraying, and preferably by ink jet printing. The colorant can be colorless benzene, naphthalene or polycyclic aromatic compound and its derivatives, and the substituent on the ring includes, but not limited to, hydroxy (OH), amine ($NH_2$), sulfonic acid ($HSO_3$), nitrite ($NO_2$), halogens, cyano (CN), methylsulfonyl, ethylsulfonyl, phenylsulfonyl, carbalkoxy (1 to 4 carbon atoms), carbo-β-alkoxyethoxy (1 to 4 carbon atoms), phenylazophenyl (substituted by chlorine, bromine, nitro, cyano), benzthiazolyl (substituted by cyano, methylsulfonyl, ethylsulfonyl, nitro), benzisothiazolyl (substituted by chlorine, bromine, nitro, cyano), thioazoyl (substituted by cyano and nitro), thienyl (substituted by cyano, methyl and nitro) and thiadiazoyl (substituted by phenyl, methyl, chlorine, bromine, methylmercapto), or aminothiazole and aniline, α-aminonaphthalene, pyridine or indole and the derivatives or compounds thereof. The black colorant includes carbon black, copper oxide, manganese dioxide, aniline black, active carbon, sudan black, derivatives of them, or other compounds in black. The red colorant includes red oxide, permanent red 4R, cadmium red, lithol red, pyrazolone red, lake red D, permanent red F5RK, allura red, alizarin lake, brilliant red, derivatives of them, or other compounds in red. The green colorant includes chrome green, pigment green B, Malachite green lake, chromium oxide, fast green G, derivatives of them, or and other compounds in green. The blue colorant includes phthalocyanine blue, metal free phthalocyanine blue, partial chlorinated phthalocyanine blue, triarylcarbonium, Berlin blue, cobalt blue, alkali blue lake, Victoria blue lake, first sky blue, Indanthrene blue BC, derivatives of them, or other compounds in blue. The yellow colorant includes chrome yellow, yellow iron oxide, naphthol yellow, hansa yellow, benzidine yellow G, benzidine yellow GR, quinoline yellow lake, nickel titanium yellow, cadmium yellow, tartrazinelake, derivatives of them, or other compounds in yellow. The orange colorant includes molybdenum orange, permanent orange GTR, pyrazolone orange, benzidine orange G, Indanthrene brilliant orange RK, Indanthrene brilliant orange GK, Balkan orange, derivatives of them, or other compounds in orange. The purple colorant includes manganese purple, first violet B, fast violet RL, fast violet lake, pigment violet EB, derivatives of them, or other compounds in purple. The listed colorant compositions and their derivatives are examples only and other colorants can also be utilized. In one embodiment, the colorant is soluble or disperseable in solvents. The organic solvents includes alcohols such as methanol, ethanol or other high molecular weight alcohols, ether such as ether, petroleum ether, tetrahydrofuran or ether derivatives, ketone such as methyl ethyl ketone, or ketone derivatives, fluoroinate solvent, halogen solvent such as chloroform, dichloromethane, aromatic solvent such as toluene, p-xylene, carboxylic acid, such as acetic acid, esters such as ethyl acetate, amide such as dimethylacetamide, dimethyl sulfoxide, alkane such as n-hexane, water or any combination of the above. The listed charge controlling agents and solvents are examples only and other charge controlling agents and solvents can also be utilized.

Then, the second-type particles, in a color of black or white and carrying charges with required polarity and charge density, are filled into the cells of the display units. In one embodiment, the process of forming the second-type particles is performed with a pulverization method or a chemical synthesis method. The pulverization method includes, but not limited to, a ball mill, a bead mill, and a jet mill. The chemical synthesis method includes, but not limited to, emulsion polymerization, suspension polymerization, and dispersion polymerization. The material of the pigment particles includes, but not limited to, styrene resin and its derivatives, nylon (polyamide) resin and its derivatives, acrylate resin and its derivatives, polyurethane resin and its derivatives, urea resin and its derivatives, polyester resin and its derivatives, epoxy resin and its derivatives, melamine resin and its derivatives, phenol resin and its derivatives, or any mixture of the aforementioned resins and the derivatives. In preferable embodiments, the second-type particles are formed of the styrene resin and/or acrylic resin with a resin ratio of about 98-50%, and preferably about 95-65%. The diameter of the pigment particles can be about 0.01-20 µm, and preferably about 0.1-10 µm. The second-type particles may contain a charge controlling agent, and the ratio of the charge controlling agent is about 0-25%, preferably, about 0-10%. The charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. The listed charge controlling agents are examples only and other charge controlling agents can also be utilized. The material from which the pigment particles are formed includes fluoroinated resin and its derivatives, fluoroinated acrylate resin and its derivatives, polysioxane resin and its derivatives, polybenzoxazine resin and its derivatives or a combination of them and their derivatives. The second-type particles have a particle size of about 0.01-20 µm, preferably, about 0.1-10 µm, and a charge density in range of about ±0-150 µC/g, preferably, ±15-120 µC/g. Further, the particles can be colored by the colorant having a ratio of about 1-50%, preferably, about 3-40%. In one embodiment, the black colorant includes carbon black, copper oxide, manganese dioxide, aniline black, active carbon, sudan black, derivatives of them, or other compounds in black. The white colorant includes titanium dioxide, zinc oxide, antimony white, zinc sulfide, derivatives of them, or other compounds in white.

Then, the charge controlling agent solution is filled into the display cells, so that the colored first-type particles has the required charge density and the polarity opposite to that of the second-type particles. In one embodiment, the filling charge controlling agent is performed by printing, coating, casting, deposition, impregnation, or spraying, and is preferably performed by ink jet printing. The charge controlling agent has a charge polarity opposite to that of the second-type particles. In one embodiment, the charge controlling agent includes nigrosine, triphenylmethane derivatives, quaternary ammonium salt, metal complex with sulfonate and carboxylic acid and its derivatives, silane and its derivatives, carboxylic acid, carboxylate salt and its derivatives, sulfonic acid, sulfonate salt and its derivatives, amine and its derivatives, thiophene and its derivatives, pyridine and its derivatives, or compounds of them. In one embodiment, the charge controlling agent is soluble or disperseable in solvents. The organic solvents includes alcohols such as methanol, ethanol or other high molecular weight alcohols, ether such as ether, petroleum ether, tetrahydrofuran or ether derivatives, ketone such as methyl ethyl ketone, or ketone derivatives, fluoroinate solvent, halogen solvent such as chloroform, dichloromethane, aromatic solvent such as toluene, p-xylene, carboxylic acid, such as acetic acid, esters such as ethyl acetate, amide such as dimethylacetamide, dimethyl sulfoxide, alkane such as n-hexane, water or any combination of the above. The listed charge controlling agents and solvents are examples only and other charge controlling agents and solvents can also be utilized.

Thus, the formation and fill of the color pigment particles in the cells are completed. In one embodiment, the remaining solution is evaporated from the cells before sealing the cells, thereby obtaining the dry powder type color pigment particles. The display units are then sealed between two substrates with electrodes. As such, when different voltages are applied onto the electrodes, an electric field is generated therebetween, and the color pigment particles will move accordingly, thereby achieving color image displaying.

These and other aspects of the present invention are further described below.

EXAMPLES OF THE INVENTION

Without intent to limit the scope of the invention, further exemplary processes and their related results according to the embodiments of the present invention are given below. Note again that titles or subtitles may be used in the examples for convenience of a reader, which in no way should limit the scope of the invention.

Example 1

Desired amounts of polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 µm.

In addition, desired amounts of polyvinyl pyrrolidone (Sigma-Aldrich), 2-2'-azobis (2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Separating and drying processes are then performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 μm and the charge density about −35 μC/g (210HS-3, Trek).

An ethylene glycol dimethyl ether (Tedia) solution formed of boron trifluoride etherate (Sigma-Aldrich) is filled therein to react with the first-type particles. Then, an ethylene glycol dimethyl ether (Tedia) solution formed of tert-butyl nitrite (Sigma-Aldrich) is provided therein, and then an ethylene glycol dimethyl ether (Tedia) solution formed of 2-naphthol (Sigma-Aldrich) is filled therein to fully react with the first-type particles under the reaction temperature of 0-10° C. The remaining solution in the cells is removed, for example, by heating. Accordingly, the formation and fill of the charged red and white particles are completed.

Example 2

Desired amounts of polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 μm.

In addition, desired amounts of polyvinyl pyrrolidone (Sigma-Aldrich), styrene (Acros), vinyl pyridine (Aldrich) and azobisisobutyronitrile (Showa) are added into an amount of ethanol and completely dissolved therein to form a second liquid mixture, which is then disposed in a high temperature environment for polymerization for a period of time. Then, separating and drying processes are performed to obtain polystyrene-vinyl pyridine particles. Further, the obtained particles, acrylic resin (CM 205, ChiMei), the charge controlling agent (Bontron N07, Orient) and carbon black (Nerox 600, Evonik) are added in a twin screw extruder (MPV 2015, APV) to make composite resin therewith, which is then milled with a milling process (LJ3, NPK) to obtain black particles with a particle size ($D_{50}$) about 3.0 μm and a charge density 54 μC/g (210HS-3, Trek). The black particles are corresponding to the second-type particles.

An ethylene glycol dimethyl ether (Tedia) solution formed of boron trifluoride etherate (Sigma-Aldrich) is filled therein to react with the first-type particles. Then, an ethylene glycol dimethyl ether (Tedia) solution formed of tert-butyl nitrite (Sigma-Aldrich) is provided therein, and then a ethylene glycol dimethyl ether (Tedia) solution formed of 2-naphthol (Sigma-Aldrich) is filled therein to fully react with the first-type particles under the reaction temperature of 0-10° C., followed by the heating process to remove the remaining solution therein. Accordingly, the formation and fill of the charged red and black particles are completed.

Example 3

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 μm.

In addition, polyvinyl pyrrolidone (Sigma-Aldrich), 2-2'-azobis(2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Then, separating and drying processes are performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 μm and the charge density about −35 μC/g (210HS-3, Trek).

An ethylene glycol dimethyl ether (Tedia) solution formed of boron trifluoride etherate (Sigma-Aldrich) is filled therein to react with the first-type particles. Then, a ethylene glycol dimethyl ether (Tedia) solution formed of tert-butyl nitrite (Sigma-Aldrich) is provided therein, and then a ethylene glycol dimethyl ether (Tedia) solution formed of 2-amino-4-methylthiazole (Sigma-Aldrich), neopentyl glycol dinitrite (Simagchem) and 3-(N,N-Diethylamino) acetanilide (Sigma-Aldrich) is filled therein to fully react with the first-type particles under the reaction temperature of 0-10° C., followed by the heating process to remove the remaining solution therein. Accordingly, the formation and fill of the charged green and white particles are completed.

Example 4

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 μm.

In addition, methyl methacrylate (Acros), vinyl pyridine (Aldrich) and azobisisobutyronitrile (Showa) are added into an amount of tetrahydrofuran and completely dissolved therein to form a second liquid mixture, which is then disposed in a high temperature environment for polymerization for a period of time. Then, separating and drying processes are performed to obtain polymethyl methacrylate-vinyl pyridine resin. Further, the obtained resin, the charge controlling agent (Bontron N07, Orient) and carbon black (Nerox 600, Evonik) are added in a twin screw extruder (MPV 2015, APV) to make composite resin therewith, which is then milled with a milling process (LJ3, NPK) to obtain black particles with a particle size ($D_{50}$) about 2.8 μm and a charge density 52 μC/g (210HS-3, Trek). The black particles are corresponding to the second-type particles.

An ethylene glycol dimethyl ether (Tedia) solution formed of boron trifluoride etherate (Sigma-Aldrich) is filled therein to react with the first-type particles. Then, an ethylene glycol dimethyl ether (Tedia) solution formed of tert-butyl nitrite (Sigma-Aldrich) is provided therein, and then an ethylene glycol dimethyl ether (Tedia) solution formed of 2-amino-4-methylthiazole (Sigma-Aldrich), neopentyl glycol dinitrite (Simagchem) and 3-(N,N-Diethylamino) acetanilide (Sigma- Aldrich) is filled therein to fully react with the first-type particles under the reaction temperature of 0-10° C. The remaining solution in the cells is removed, for example, by heating. Accordingly, the formation and fill of the charged green and black particles are completed.

Example 5

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 µm.

In addition, polyvinyl pyrrolidone (Sigma-Aldrich), 2-2'-azobis (2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Then, separating and drying processes are performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 µm and the charge density about −35 µC/g (210HS-3, Trek).

An ethylene glycol dimethyl ether (Tedia) solution formed of boron trifluoride etherate (Sigma-Aldrich) is filled therein to react with the first-type particles. Then, an ethylene glycol dimethyl ether (Tedia) solution formed of tert-butyl nitrite (Sigma-Aldrich) is provided therein, and then an ethylene glycol dimethyl ether (Tedia) solution formed of 2-amino-4-methylthiazole (Sigma-Aldrich), neopentyl glycol dinitrite (Simagchem), and N,N-β-cyanoethyl-ethylaniline (TCI) is filled therein to fully react with the first-type particles under the reaction temperature of 0-10° C. The remaining solution in the cells is removed, for example, by heating. Accordingly, the formation and fill of the charged blue and white particles are completed.

Example 6

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 µm.

In addition, desired amounts of polyvinyl pyrrolidone (Sigma-Aldrich), styrene (Acros), vinyl pyridine (Aldrich) and azobisisobutyronitrile (Showa) are added into an amount of ethanol and completely dissolved therein to form a second liquid mixture, which is then disposed in a high temperature environment for polymerization for a period of time. Then, separating and drying processes are performed to obtain polystyrene-vinyl pyridine particles. Further, the obtained particles, acrylic resin (CM 205, ChiMei), the charge controlling agent (Bontron N07, Orient) and carbon black (Nerox 600, Evonik) are added in a twin screw extruder (MPV 2015, APV) to make composite resin therewith, which is then milled with a milling process (LJ3, NPK) to obtain black particles with a particle size ($D_{50}$) about 3.0 µm and a charge density 54 µC/g (210HS-3, Trek). The black particles are corresponding to the second-type particles.

An ethylene glycol dimethyl ether (Tedia) solution formed of boron trifluoride etherate (Sigma-Aldrich), an ethylene glycol dimethyl ether (Tedia) solution formed of tert-butyl nitrite (Sigma-Aldrich) is filled therein to react with the first-type particles, and then an ethylene glycol dimethyl ether (Tedia) solution formed of 2-amino-4-methylthiazole (Sigma-Aldrich), neopentyl glycol dinitrite (Simagchem), and N,N-β-cyanoethyl-ethylaniline (TCI) is filled therein to fully react with the first-type particles under the reaction temperature of 0-10° C. The remaining solution in the cells is removed, for example, by heating. Accordingly, the formation and fill of the charged blue and black particles are completed.

Example 7

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 µm.

In addition, polyvinyl pyrrolidone (Sigma-Aldrich), 2-2'-azobis (2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Then, separating and drying processes are performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 µm and the charge density about −35 µC/g (210HS-3, Trek).

An ethylene glycol dimethyl ether (Tedia) solution formed of boron trifluoride etherate (Sigma-Aldrich) is filled therein to react with the first-type particles. Then, a ethylene glycol dimethyl ether (Tedia) solution formed of tert-butyl nitrite (Sigma-Aldrich) is provided therein, and then a ethylene glycol dimethyl ether (Tedia) solution formed of phenol (Sigma-Aldrich) is filled therein to fully react with the first-type particles under the reaction temperature of 0-10° C., followed by the heating process to remove the remaining solution therein. Accordingly, the formation and fill of the charged yellow and white particles are completed.

Example 8

Polyvinyl pyrrolidone (Sigma-Aldrich), 2-2'-azobis (2-methyl-butyronitrile) (TCI), vinyl aniline (Alfa-Aesar), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 µm.

In addition, methyl methacrylate (Acros), vinyl pyridine (Aldrich) and azobisisobutyronitrile (Showa) are added into an amount of tetrahydrofuran and completely dissolved therein to form a second liquid mixture, which is then disposed in a high temperature environment for polymerization for a period of time. Then, separating and drying processes are performed to obtain polymethyl methacrylate-vinyl pyridine resin. Further, the obtained resin, the charge controlling agent (Bontron N07, Orient) and carbon black (Nerox 600, Evonik) are added in a twin screw extruder (MPV 2015, APV) to make composite resin therewith, which is then milled with a milling process (LJ3, NPK) to obtain black particles with a particle size ($D_{50}$) about 2.8 μm and a charge density 52 μC/g (210HS-3, Trek). The black particles are corresponding to the second-type particles.

An ethylene glycol dimethyl ether (Tedia) solution formed of boron trifluoride etherate (Sigma-Aldrich) is filled therein to react with the first-type particles. Then, an ethylene glycol dimethyl ether (Tedia) solution formed of tert-butyl nitrite (Sigma-Aldrich) is provided therein, and then an ethylene glycol dimethyl ether (Tedia) solution formed of phenol (Sigma-Aldrich) is filled therein to fully react with the first-type particles under the reaction temperature of 0-10° C., followed by the heating process to remove the remaining solution therein. Accordingly, the formation and fill of the charged yellow and black particles are completed.

Example 9

Polyvinyl pyrrolidone (Sigma-Aldrich), 2-2'-azobis (2-methyl-butyronitrile) (TCI), 2-aminoethyl methacrylate hydrochloride (Acros), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 μm.

In addition, polyvinyl pyrrolidone (Sigma-Aldrich), 2-2'-azobis (2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Then, separating and drying processes are performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 μm and the charge density about −35 μC/g (210HS-3, Trek).

An ethylene glycol dimethyl ether (Tedia) solution formed of thionyl chloride (Merck) is filled therein to react with the first-type particles, and then an ethylene glycol dimethyl ether (Tedia) solution formed of hemin (TCI) is filled therein to fully react with the first-type particles under the reaction temperature of 25-40° C., followed by the heating process to remove the remaining solution therein. Accordingly, the formation and fill of the charged black and white particles are completed.

Example 10

Polyvinyl pyrrolidone (Sigma-Aldrich), 2-2'-azobis (2-methyl-butyronitrile) (TCI), 2-carboxyethyl acrylate (Aldrich), divinylbenzene (Aldrich) and styrene (Acros) are added into an amount of ethanol and completely dissolved therein to form a first liquid mixture, which is then disposed in a high temperature environment for polymerization for a period of time. Then, separating and drying processes are performed to obtain first-type particles with a particle size ($D_{50}$) about 3.0 μm.

In addition, polyvinyl pyrrolidone (Sigma-Aldrich), 2-2'-azobis (2-methyl-butyronitrile) (TCI), 1H,1H,2H,2H-heptadecafluorodecyl methacrylate (Matrix), divinylbenzene (Aldrich) and styrene (Acros) are added into an amount of ethanol and completely dissolved therein to form a second liquid mixture, which is then disposed in a high temperature environment for polymerization for a period of time. Then, separating and drying processes are performed to obtain particles. The obtained particles are then coated with $TiO_2$ powders (R102, DuPont) and the charge controlling agent (Bontron E84, Orient), by the dry coating process, to obtain second-type particles with a particle size ($D_{50}$) about 3.0 μm and the charge density about −35 μC/g (210HS-3, Trek).

An ethylene glycol dimethyl ether (Tedia) solution formed of thionyl chloride (Merck) is filled therein to react with the first-type particles, and then an ethylene glycol dimethyl ether (Tedia) solution formed of perylene-based pigment containing amine groups is filled therein to fully react with the first-type particles under the reaction temperature of 25-40° C., followed by the heating process to remove the remaining solution therein. Then, an ethanol/tetrahydrofuran solution containing the charge controlling agent (Bontron P51, Orient) is filled therein, followed by the heating process to remove the remaining solution therein. Accordingly, the formation and fill of the charged red and white particles are completed.

In brief, the present invention, among other things, recites a simplified but effective method of manufacturing a switchable color PBD. According to the invention, the method includes filling a plurality of first-type particles into the one or more cells of each display unit, filling one or more colorant solutions into the one or more cells of each display unit, respectively, so that each cell contains one of the one or more solutions, where each of the one or more colorant solutions comprises a respective colorant, and the respective colorant in each cell reacts with or adsorbs on the first-type particles therein, and filling a plurality of second-type particles into the one or more cells of each display unit. The first-type particles include wettable particles having reaction selectivity and light fastness, and the color thereof can be colorless or white. The colorants react with the first-type particles so that the first-type particles in different cells display different colors. The second-type particles can be in a color of black or white. The display units are then sealed between two electrodes. As such, when different voltages are applied onto the electrodes, an electric field is generated therebetween, and the color pigment particles will move accordingly, thereby achieving color image displaying.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for manufacturing a switchable particle-based display having a plurality of display units spatially arranged in a matrix form, wherein each display unit comprises one or more cells, comprising:
    filling a plurality of first-type particles into the one or more cells of each display unit;
    filling one or more solutions into the one or more cells of each display unit, respectively, so that each cell contains one of the one or more solutions, wherein each of the one or more solutions comprises a respective colorant, and wherein the respective colorant in each cell reacts with or adsorbs on the first-type particles therein; and
    filling a plurality of second-type particles into the one or more cells of each display unit.

2. The method of claim 1, further comprising sealing the one or more cells of each display unit subsequent to filling the plurality of second-type particles into the one or more cells of each display unit.

3. The method of claim 1, further comprising removing the one or more solutions prior to filling the plurality of second-type particles into the one or more cells of each display unit.

4. The method of claim 3, further comprising sealing the one or more cells of each display unit subsequent to filling the plurality of second-type particles into the one or more cells of each display unit.

5. The method of claim 1, wherein the plurality of first-type particles is colorless or in a color of white prior to filling the one or more solutions into the one or more cells of each display unit.

6. The method of claim 1, wherein the plurality of first-type particles is in a color of red, green, blue, cyan, magenta, yellow, or black, subsequent to filling the one or more solutions into the one or more cells of each display unit.

7. The method of claim 1, wherein the plurality of second-type particles is in a color of white or black.

8. The method of claim 1, wherein the plurality of first-type particles has a charge polarity opposite to that of the plurality of second-type particles.

9. The method of claim 1, wherein filling the one or more solutions into the one or more cells of each display unit is performed with printing, coating, casting, deposition, impregnation, spraying, or combinations thereof.

10. The method of claim 9, wherein filling the one or more solutions into the one or more cells of each display unit is performed with inkjet printing.

11. The method of claim 1, wherein filling the one or more solutions into the one or more cells of each display unit comprises filling each of the one or more solutions into a corresponding one of the one or more cells of each display unit simultaneously or individually.

12. The method of claim 1, wherein the plurality of first-type particles comprises a UV stabilizer or an anti-oxidant.

13. The method of claim 1, wherein the respective colorant comprises a respective color precursor.

14. The method of claim 1, wherein the one or more solutions comprise a first solution containing a first colorant.

15. The method of claim 1, wherein each display unit comprises at least two cells, wherein the one or more solutions comprise a first solution and a second solution containing a first colorant and a second colorant, respectively, and wherein the first and second colorants comprise first and second color precursors, respectively.

16. The method of claim 1, wherein each display unit comprises at least three cells, wherein the one or more solutions comprise a first solution, a second solution and a third solution containing a first colorant, a second colorant and a third colorant, respectively, and wherein the first, second and third colorants comprise first, second and third color precursors, respectively.

17. The method of claim 1, wherein each display unit comprises at least four cells, wherein the one or more solutions comprise a first solution, a second solution, a third solution and a fourth solution containing a first colorant, a second colorant, a third colorant and a fourth colorant, respectively, and wherein the first, second, third and fourth colorants comprise first, second, third and fourth color precursors, respectively.

18. The method of claim 1, further comprising filling a charge controlling solution containing a charge controlling agent into the one or more cells of each display unit such that the charge controlling agent reacts with or adsorbs on the plurality of first-type particles.

19. The method of claim 18, wherein filling the charge controlling solution into the one or more cells of each display unit is performed with printing, coating, casting, deposition, impregnation, spraying, or combinations thereof.

20. The method of claim 19 wherein filling the charge controlling solution into the one or more cells of each display unit is performed with inkjet printing.

21. The method of claim 18, further comprising sealing the one or more cells of each display unit subsequent to filling the charge controlling solution.

22. The method of claim 18, further comprising:
    removing the one or more solutions and the charge controlling solution from the one or more cells of each display unit after the charge controlling agent reacts with or adsorbs on the plurality of first-type particles; and
    sealing the one or more cells of each display unit.

23. The method of claim 18, wherein the plurality of first-type particles are colorless or white prior to filling the solution into the one or more cells of each display unit and the plurality of second-type particles are white or black.

24. The method of claim 18, wherein the surface of the second-type particles is non-wettable.

25. The method of claim 18, wherein the charge polarity of the plurality of first-type particles is opposite to that of the plurality of second-type particles subsequent to filling the charge controlling solution into the one or more cells of each display unit.

26. A method for manufacturing a switchable particle-based display having a plurality of display units spatially arranged in a matrix form, wherein each display unit comprises a plurality of cells, comprising:
    filling a plurality of first-type particles into the plurality of cells of each display unit;
    filling a first solution comprising a first colorant into a first part of the plurality of cells of each display unit such that the first colorant in the first part of the plurality of cells of each display unit reacts with or adsorbs on the first-type particles therein; and
    filling a plurality of second-type particles into the plurality of cells of each display unit.

27. The method of claim 26, further comprising removing the first solution from the first part of the plurality of cells of each display unit prior to filling the plurality of second-type particles into the plurality of cells of each display unit.

28. The method of claim 27, further comprising sealing the plurality of cells of each display unit subsequent to filling the plurality of second-type particles into the plurality of cells of each display unit.

29. The method of claim 26, further comprising sealing the plurality of cells of each display unit subsequent to filling the plurality of second-type particles into the plurality of cells of each display unit.

30. The method of claim 26, wherein the plurality of first-type particles is colorless or in a color of white prior to filling the first solution into the first part of the plurality of cells of each display unit.

31. The method of claim 26, wherein the plurality of second-type particles is in a color of white or black.

32. The method of claim 26, wherein the plurality of first-type particles has a charge polarity opposite to that of the plurality of second-type particles.

33. The method of claim 26, wherein filling the first solution into the first part of the plurality of cells of each display unit is performed with printing, coating, casting, deposition, impregnation, spraying, or combinations thereof.

34. The method of claim 33, wherein filling the first solution into the first part of the plurality of cells of each display unit is performed with inkjet printing.

35. The method of claim 26, wherein the plurality of first-type particles is in a color of red, green, blue, cyan, magenta, yellow, or black, subsequent to filling the first solution into the first part of the plurality of cells of each display unit.

36. The method of claim 26, prior to filling the plurality of second-type particles into the plurality of cells of each display unit, further comprising filling a second solution containing a second colorant into a second part of the plurality of cells of each display unit such that the second colorant in the second part of the plurality of cells of each display unit reacts with or adsorbs on the first-type particles therein.

37. The method of claim 36, wherein the first-type particles in the first part of the plurality of cells of each display unit and the first-type particles in the second part of the plurality of cells of each display unit are of different colors, subsequent to filling the second solution into the second part of the plurality of cells of each display unit.

38. The method of claim 26, wherein the plurality of first-type particles is in a color of red, green, blue, cyan, magenta, yellow, or black subsequent to filling the second solution into the second part of the plurality of cells of each display unit.

39. The method of claim 36, prior to filling the plurality of second-type particles into the plurality of cells of each display unit, further comprising filling a third solution containing a third colorant into a third part of the plurality of cells of each display unit such that the third colorant in the third part of the plurality of cells of each display unit reacts with or adsorbs on the first-type particles therein.

40. The method of claim 39, wherein the first-type particles in the first part of the plurality of cells of each display unit, the first-type particles in the second part of the plurality of cells of each display unit and the first-type particles in the third part of the plurality of cells of each display unit are of different colors, subsequent to filling the third solution into the third part of the plurality of cells of each display unit.

41. The method of claim 40, wherein the plurality of first-type particles is in a color of red, green, blue, cyan, magenta, yellow, or black subsequent to filling the third solution into the third part of the plurality of cells of each display unit.

42. The method of claim 39, prior to filling the plurality of second-type particles into the plurality of cells of each display unit, further comprising filling a fourth solution containing a fourth colorant into a fourth part of the plurality of cells of each display unit such that the fourth colorant in the fourth part of the plurality of cells of each display unit reacts with or adsorbs on the first-type particles therein.

43. The method of claim 42, wherein the first-type particles in the first part of the plurality of cells of each display unit, the first-type particles in the second part of the plurality of cells of each display unit, the first-type particles in the third part of the plurality of cells of each display unit and the first-type particles in the fourth part of the plurality of cells of each display unit are of different colors, subsequent to filling the fourth solution into the third part of the plurality of cells of each display unit.

44. The method of claim 43, wherein the plurality of first-type particles is in a color of red, green, blue, cyan, magenta, yellow, or black subsequent to filling the fourth solution into the fourth part of the plurality of cells of each display unit.

45. The method of claim 26, wherein the plurality of first-type particles comprises a UV stabilizer or an anti-oxidant.

46. The method of claim 26, wherein the first colorant comprises a first color precursor.

47. A method for manufacturing a switchable particle-based display having a plurality of cells, comprising:
filling a plurality of first-type particles into each of the plurality of cells;
filling a solution comprising a colorant into each of the plurality of cells, such that the colorant reacts with or adsorbs on the plurality of first-type particles therein; and
filling a plurality of second-type particles into each of the plurality of cells.

* * * * *